United States Patent
Sun et al.

(10) Patent No.: US 10,085,281 B2
(45) Date of Patent: Sep. 25, 2018

(54) CHANNEL ACCESS FOR A MIXED NUMEROLOGY CARRIER

(71) Applicant: QUALCOMM Incorporated, San Diego, CA (US)

(72) Inventors: Jing Sun, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/824,989

(22) Filed: Nov. 28, 2017

(65) Prior Publication Data

US 2018/0152964 A1    May 31, 2018

Related U.S. Application Data

(60) Provisional application No. 62/427,709, filed on Nov. 29, 2016.

(51) Int. Cl.
*H04W 74/00* (2009.01)
*H04W 72/04* (2009.01)
(Continued)

(52) U.S. Cl.
CPC ......... *H04W 74/006* (2013.01); *H04L 5/0053* (2013.01); *H04L 7/10* (2013.01);
(Continued)

(58) Field of Classification Search
CPC ............ H04W 74/006; H04W 72/042; H04W 72/1273; H04W 72/0446; H04L 5/0053; H04L 5/0007; H04L 7/10; H04L 27/2605
See application file for complete search history.

(56) References Cited

U.S. PATENT DOCUMENTS

| | | | |
|---|---|---|---|
| 2010/0167746 A1* | 7/2010 | Lee | H04W 48/12 455/450 |
| 2013/0028150 A1* | 1/2013 | Ma | H04W 76/025 370/280 |

(Continued)

FOREIGN PATENT DOCUMENTS

| WO | WO-2016040290 A1 | 3/2016 |
|---|---|---|
| WO | WO-2017171523 A1 | 10/2017 |

OTHER PUBLICATIONS

International Search Report and Written Opinion—PCT/US2017/063767—ISA/EPO—dated Feb. 26, 2018.

(Continued)

*Primary Examiner* — Stephen J Clawson
(74) *Attorney, Agent, or Firm* — Loza & Loza, LLP

(57) ABSTRACT

In a radio air interface, a mixed-numerology carrier is one that multiplexes orthogonal frequency division multiplexed (OFDM) waveforms that have different numerologies onto the same carrier. This disclosure provides for a sync signal (SS) enabling channel access for such a mixed-numerology carrier. In one example, a single SS, having a given numerology, supports channel access for a plurality of numerologies on the mixed-numerology carrier. In another example, a plurality of numerologies on the mixed-numerology carrier each has its own respective SS, and a single, common numerology is used for all SS's. In still another example, a plurality of numerologies on the mixed-numerology carrier each has its own respective SS, where each SS has the same numerology as the numerology for which the SS provides channel access.

28 Claims, 15 Drawing Sheets

Multiple Sync Channels with Single, Common Numerology

(51) Int. Cl.
*H04L 7/10* (2006.01)
*H04L 5/00* (2006.01)
*H04W 72/12* (2009.01)
*H04L 27/26* (2006.01)

(52) U.S. Cl.
CPC ....... *H04L 27/2605* (2013.01); *H04W 72/042* (2013.01); *H04W 72/1273* (2013.01); *H04L 5/0007* (2013.01); *H04W 72/0446* (2013.01)

(56) References Cited

U.S. PATENT DOCUMENTS

| | | | |
|---|---|---|---|
| 2015/0230249 A1* | 8/2015 | Nguyen | H04L 5/0094 370/329 |
| 2016/0269135 A1 | 9/2016 | Jiang et al. | |
| 2016/0352551 A1* | 12/2016 | Zhang | H04L 27/2602 |
| 2017/0230954 A1 | 8/2017 | Au et al. | |
| 2017/0311276 A1 | 10/2017 | Tsai et al. | |
| 2017/0311315 A1 | 10/2017 | Islam et al. | |

OTHER PUBLICATIONS

Sharp: "Synchronization Signal Design for NB-IoT", 3GPP TSG RAN WG1 Meeting #83, R1-157119, 3rd Generation Partnership Project (3GPP), Mobile Competence Centre; 650, Route Des Lucioles; F-06921 Sophia-Anti Polis Cedex; France, vol. RAN WG1, No. Anaheim, USA; Nov. 15, 2015, XP051040013, Retrieved from the Internet: URL:http://www.3gpp.org/ftp/Meetings_3GPP_Sync/RAN1/Docs/ [retrieved on Nov. 15, 2015], 4 pages.

* cited by examiner

Mixed Numerology

Single Sync Channel

Multiple Sync Channels with Single, Common Numerology

Multiple Sync Channels with Different Numerologies

CHANNEL ACCESS FOR A MIXED NUMEROLOGY CARRIER

PRIORITY CLAIM

This application claims priority to and the benefit of Provisional Patent Application No. 62/427,709, filed in the United States Patent and Trademark Office on Nov. 29, 2016, and titled, "Mixed Numerology Carrier," the entire content of which is incorporated herein by reference as if fully set forth below in its entirety and for all applicable purposes.

TECHNICAL FIELD

The technology discussed below relates generally to wireless communication systems, and more particularly, to design aspects of a wireless carrier that multiplexes communication signals having different numerologies.

INTRODUCTION

Wireless communication networks continue to evolve to meet the growing demand for mobile broadband access. As these technologies continue to improve, additional use cases and capabilities become possible. Contemporary efforts are working to expand the domain of these wireless technologies to provide improved convenience and productivity, including enhanced mobile broadband communications, millimeter-wave communication, and ultra-reliable low-latency communication for mission-critical services. For a network to provide support for this broad array of areas there is a need for a flexible and dynamic scheme for multiplexing a variety of waveforms onto a single carrier.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication operable at a user equipment (UE) is disclosed. The method includes searching a mixed-numerology carrier for a sync signal (SS), which has an SS numerology. The mixed-numerology carrier includes waveforms of a plurality of numerologies, including the SS numerology, a first numerology, and a second numerology that differs from the first numerology. The SS numerology may be the same as the first numerology, in which case the first numerology/SS numerology may be referred to as the primary numerology. However, the SS numerology may differ from the first numerology. The method further includes detecting the SS, and reading configuration information it carries: for example, a master information block (MIB) on a broadcast channel. The configuration information corresponds to one or more channels on the carrier, including a first channel, which may be a downlink (DL) common control channel. The configuration information may further indicate that the first channel has the first numerology. The method further includes receiving the first channel, which has the first numerology. The first channel is received based on the configuration information.

In another example, a method of wireless communication operable at a scheduling entity, such as a base station, is disclosed. The method includes transmitting a first sync signal (SS), using an SS numerology, on a mixed-numerology carrier. The first SS includes first configuration information, such as a master information block (MIB), which may be carried on a broadcast channel. The first configuration information corresponds to a first channel on the carrier, such as a downlink (DL) common control channel, and may indicate that the first channel uses the first numerology. The SS numerology may be the same as the first numerology, in which case the first numerology may be referred to as the primary numerology. However, the SS numerology may differ from the first numerology. The method further includes transmitting the first channel on the carrier using a first numerology, and transmitting a second channel on the carrier using a second numerology.

In another example, a method of wireless communication operable at a user equipment (UE) is disclosed. The method includes searching a mixed-numerology carrier for a sync signal (SS), which has an SS numerology. The mixed numerology carrier includes waveforms of a plurality of numerologies, including the SS numerology, a first numerology, and a second numerology that differs from the first numerology. The method further includes detecting a first SS, and reading first configuration information it carries: for example, a master information block (MIB) on a broadcast channel. The first configuration information corresponds to a first channel on the carrier, which may be a downlink (DL) common control channel. The first configuration information further indicates the first numerology of the first channel. In this example, the UE may or may not support the first numerology. If the UE supports the first numerology, then the method further includes receiving the first channel, which has the first numerology. The first channel is received based on the configuration information. However, if the UE does not support the first numerology, then the method includes forgoing to receive the first channel.

In another example, a method of wireless communication operable at a scheduling entity, such as a base station, is disclosed. The method includes transmitting a first sync signal (SS), using an SS numerology, on a mixed-numerology carrier. The first SS includes first configuration information, such as a master information block (MIB), which may be carried on a broadcast channel. The first configuration information corresponds to a first channel, such as a first downlink (DL) common control channel, having a first numerology on the carrier. The first configuration information may further indicate that the first channel uses the first numerology. The method further includes transmitting a second SS using the SS numerology on the carrier. The second SS includes second configuration information, such as a MIB, which may be carried on a broadcast channel. The second configuration information corresponds to a second channel, such as a second DL common control channel, having a second numerology, different from the first numerology, on the carrier. The second configuration information may further indicate that the second channel uses the second numerology. The method further includes transmitting the first channel using the first numerology on the carrier and transmitting the second channel using the second numerology on the carrier.

In another example, a method of wireless communication operable at a scheduling entity, such as a base station, is disclosed. The method includes transmitting a first sync signal (SS), using a first numerology, on a mixed-numerology carrier. The first SS includes first configuration information, such as a master information block (MIB), which may be carried on a broadcast channel. The first configuration information corresponds to a first channel, such as a first downlink (DL) common control channel, having a first numerology on the carrier. The method further includes transmitting a second SS using a second numerology on the carrier. The second SS includes second configuration information, such as a MIB, which may be carried on a broadcast channel. The second configuration information corresponds to a second channel having the second numerology on the carrier. The method further includes transmitting the first channel on the carrier using the first numerology and transmitting the second channel on the carrier using the second numerology.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure provide for a sync signal (SS) enabling channel access for a mixed-numerology carrier. In one example, a single SS, having a given numerology, supports channel access for a plurality of numerologies on the mixed-numerology carrier. In another example, a plurality of numerologies on the mixed-numerology carrier each has its own respective SS, and a single, common numerology is used for all SS's. In still another example, a plurality of numerologies on the mixed-numerology carrier each has its own respective SS, where each SS has the same numerology as the numerology for which the SS provides channel access.

Figure 1:
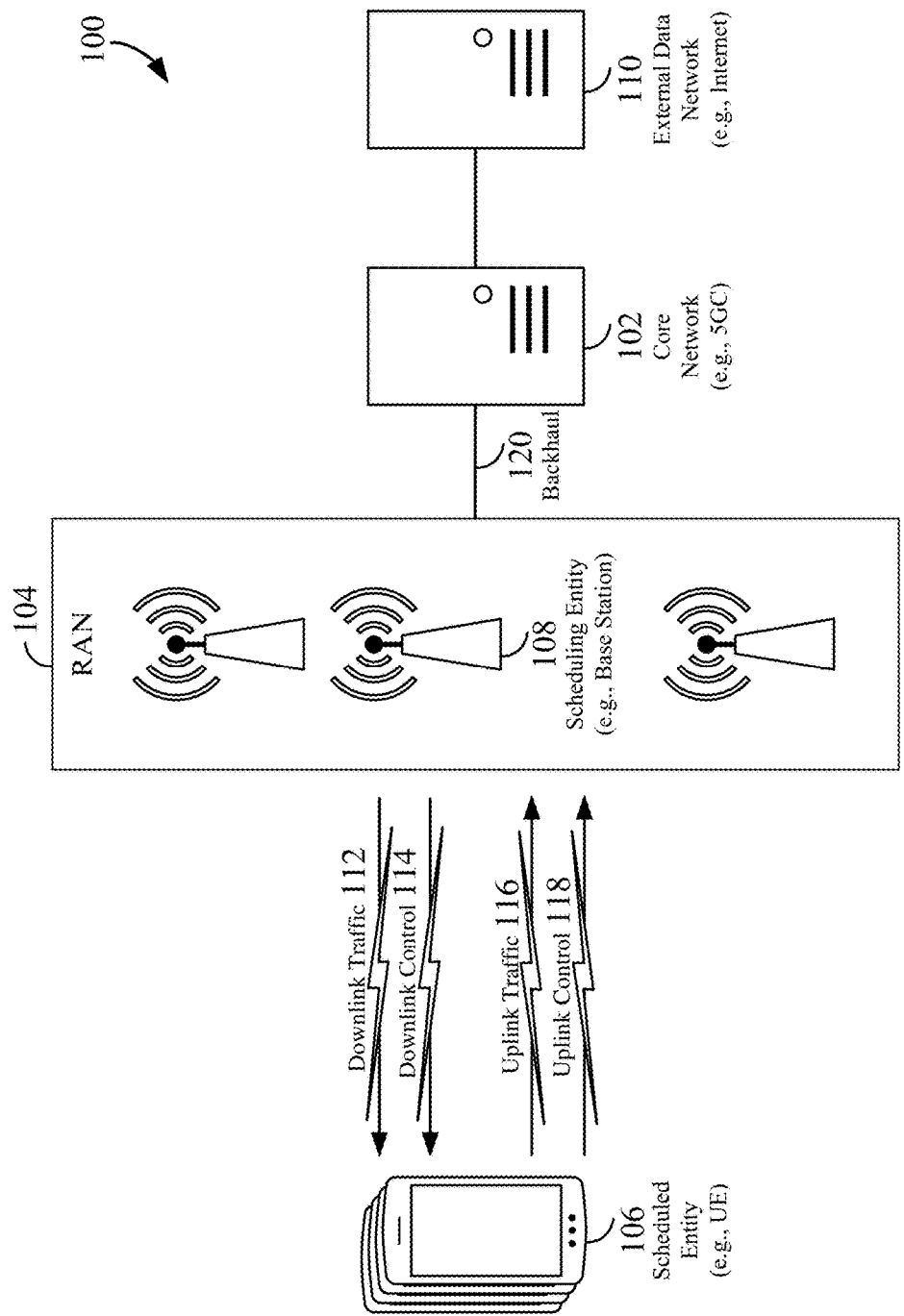
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may transmit downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
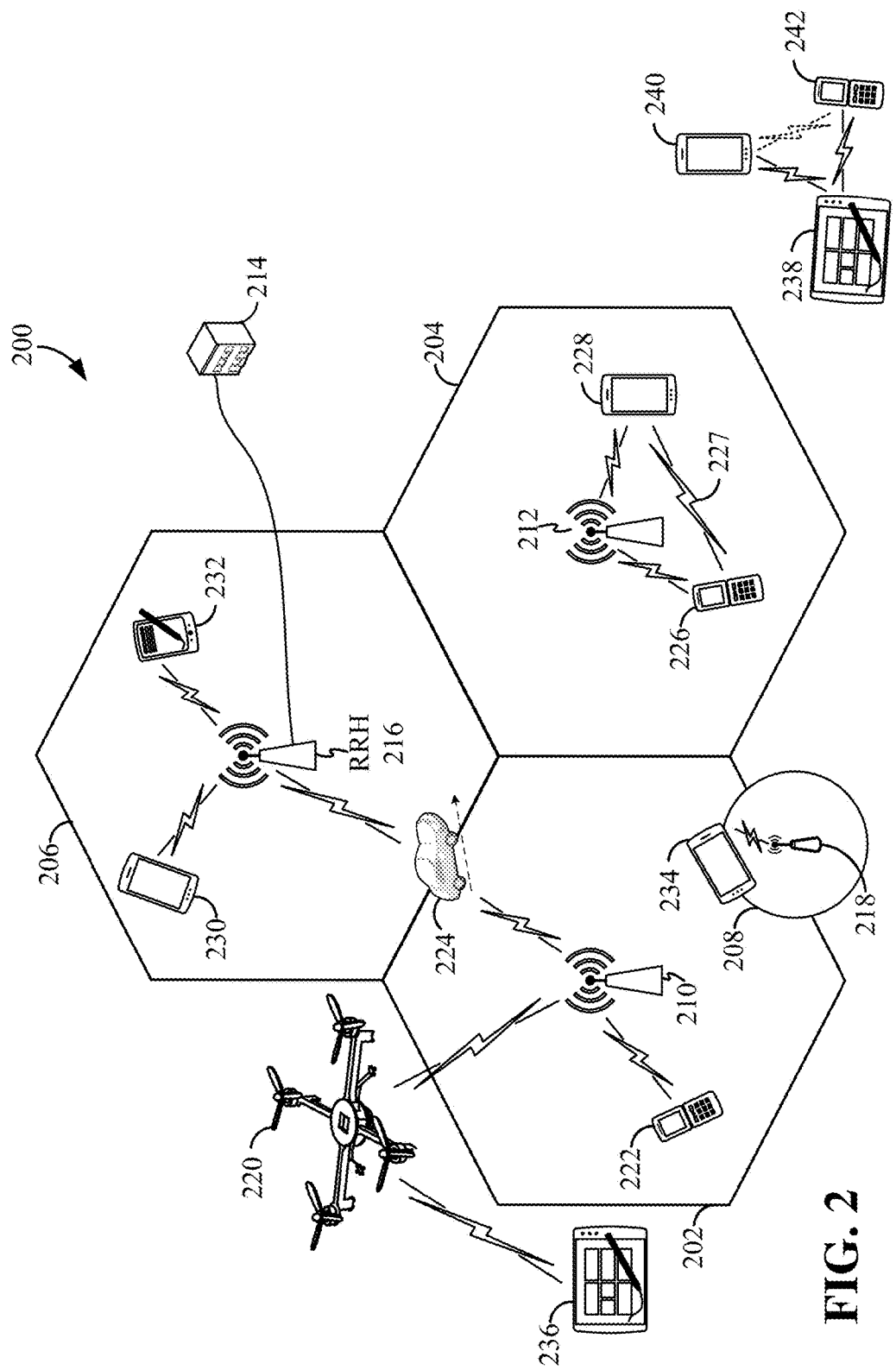
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification transmitted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

By way of illustration, various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Figure 3:
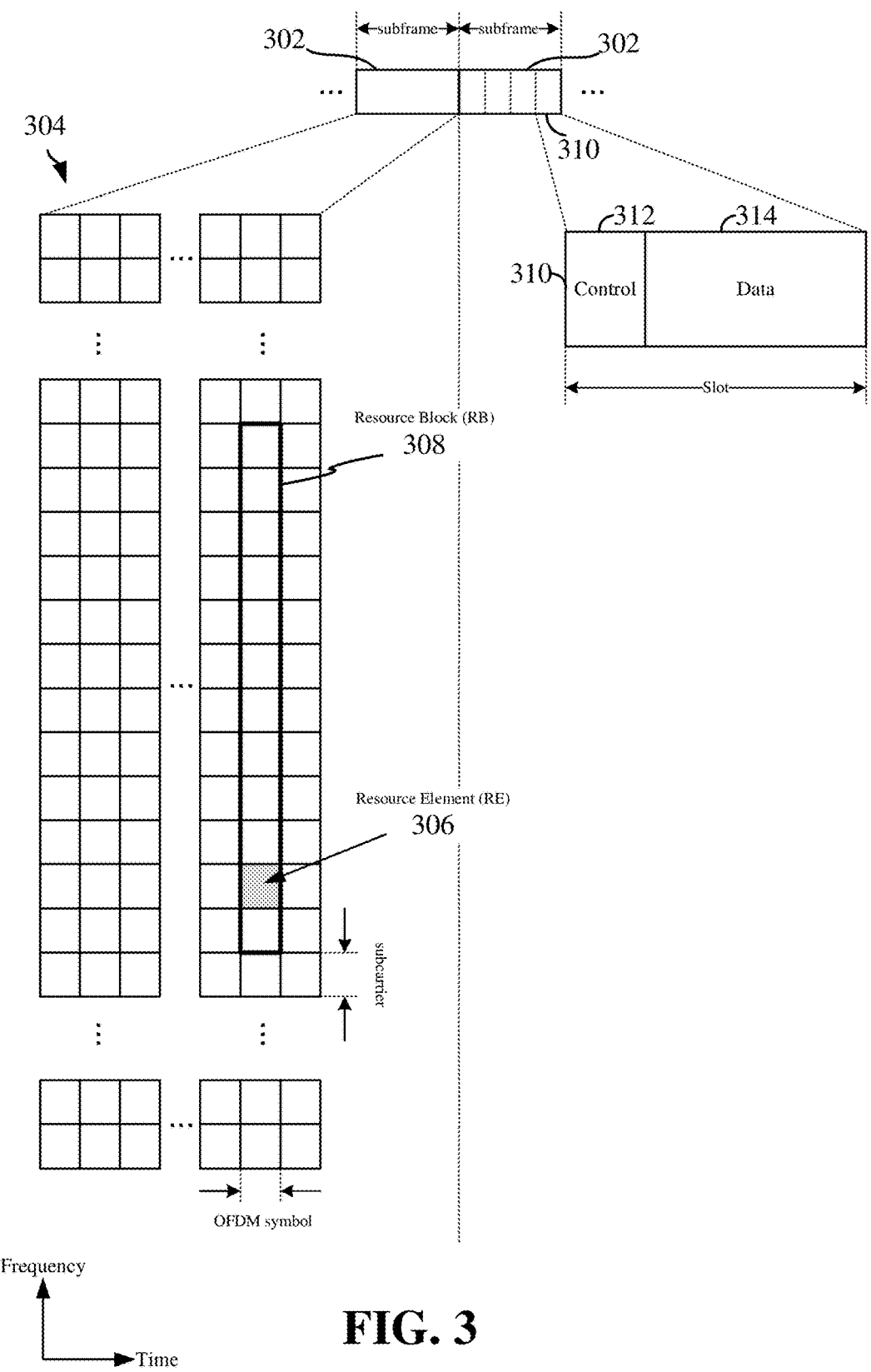
FIG. 3 is a schematic illustration of an organization of time-frequency resources on a carrier utilizing orthogonal frequency divisional multiplexing (OFDM).

Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). In various examples, a slot 310 may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although the illustration of the slot 310 in FIG. 3 shows both the control and data regions 312 and 314, respectively, appearing to occupy the entire bandwidth of the slot 310, this is not necessarily the case. For example, a DL control region 312 may occupy only a portion of the system bandwidth. In some aspects of the present disclosure, the DL control region 312 may be a downlink common burst or a common control region. In this example, a common control region may be common, in that its bandwidth and location within the system bandwidth for that slot may be predetermined, or known to various devices in the RAN 104.

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

According to various aspects of the disclosure, a scheduling entity may transmit one or more synchronization (sync) signals or sync channels over its respective cell. A sync signal (SS) may be a narrowband signal. For example, out of a carrier bandwidth of 100 MHz, an SS may have a bandwidth of 5 MHz. However, this is merely an illustrative example and any suitable SS bandwidth may be utilized.

Figure 4:
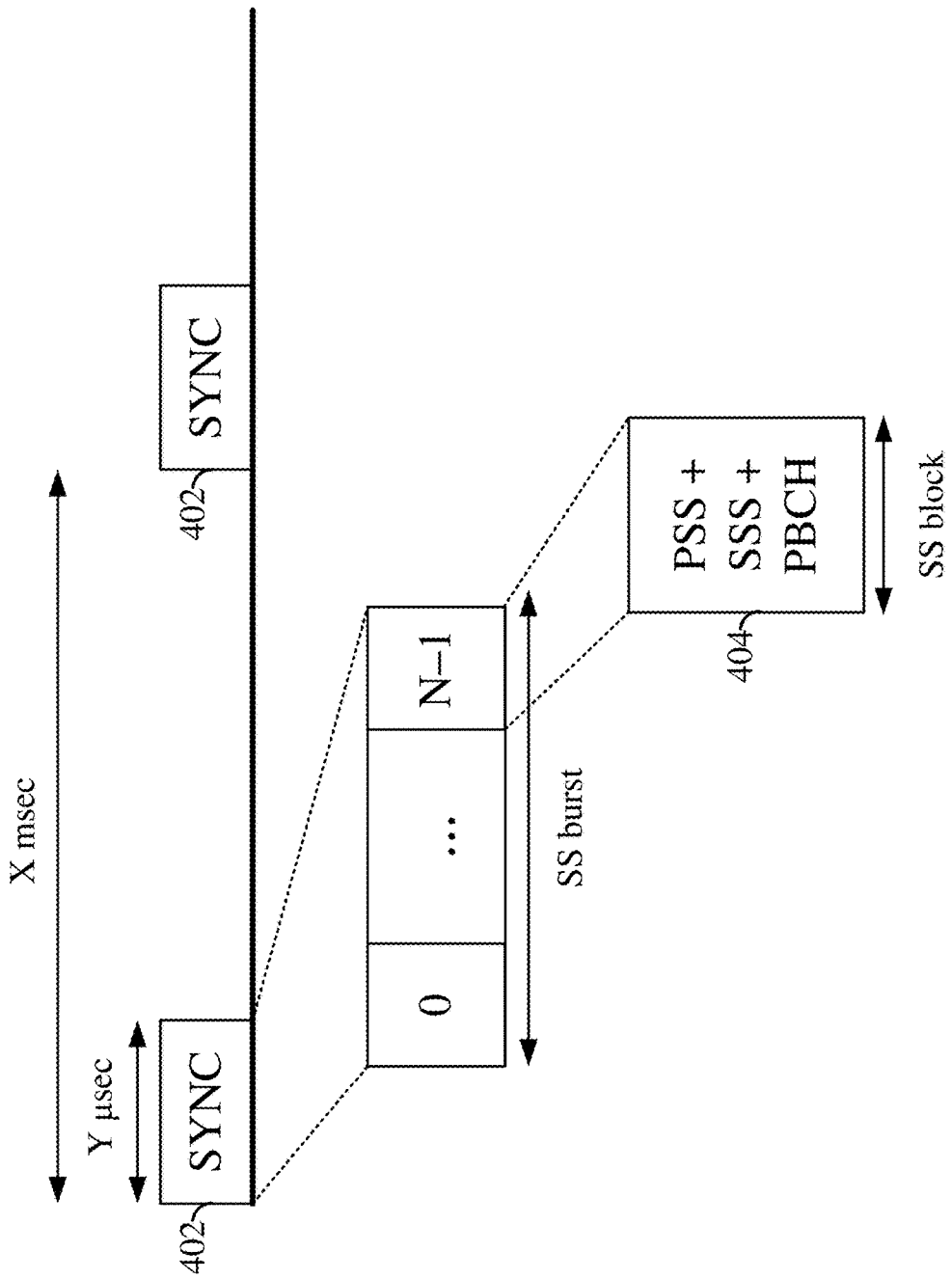
FIG. 4 is a schematic illustration of an exemplary sync signal (SS).

FIG. 4 is a schematic illustration of a design for an SS transmission as it may be implemented according to some aspects of the present disclosure. In FIG. 4, two SS bursts 402 are illustrated, although an SS burst set may include any suitable number of SS bursts 402. In some examples, an SS burst set may include periodic transmissions of the SS bursts 402, e.g., every X milliseconds (X msec), every half-frame, etc., although any periodicity of SS bursts may be utilized. In other examples, aperiodic SS burst 402 transmissions may be utilized. Each SS burst 402 may include N SS blocks 404, extending for a duration of Y microseconds (Y μsec). As a further illustrative example, each SS block 404 may include a primary synchronization signal (PSS), a secondary synchronization signal (SSS), and a physical broadcast channel (PBCH) in consecutive OFDM symbols. Other examples may utilize greater or fewer than two synchronization signals; may include one or more supplemental channels in addition to the PBCH; may omit a PBCH; and/or may utilize nonconsecutive symbols for an SS block, within the scope of the present disclosure.

To gain access to the information on the carrier, a UE 106 may utilize a raster, or a list of hypotheses, to scan or search for an SS. That is, the UE 106 may tune its receiver to attempt to receive a sync signal at a given frequency in the air interface, re-tuning to the next candidate frequency until an SS is identified. As one non-limiting example, a UE 106 may have a raster with approximately 5 or 6 possible locations of the sync signal to search within a 100 MHz bandwidth.

Utilization of the SS to gain access to the information on the carrier may take a variety of different forms. Some examples, described in further detail below, include the utilization of a single SS for a plurality of numerologies, or the utilization of multiple SS's, i.e., one SS for each of a plurality of numerologies. When utilizing multiple SS's, the respective SS's may share the same numerology as one another, or in other examples, an SS may have the same numerology as a corresponding numerology for communication of control and traffic information. These and other examples are described in further detail below.

Referring once again to FIG. 3, according to aspects of a DL transmission, the transmitting device (e.g., scheduling entity 108) may allocate one or more REs 306 (e.g., within a control region 312) to carry DL control information 114 including one or more DL control channels, such as a physical control format indicator channel (PCFICH); a physical hybrid automatic repeat request (HARQ) indicator channel (PHICH); and/or a physical downlink control channel (PDCCH), etc., to one or more scheduled entities 106.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the UL control information 118 may include a scheduling request (SR), i.e., request for the scheduling entity 108 to schedule uplink transmissions. Here, in response to the SR transmitted on the UL control channel 118, the scheduling entity 108 may transmit DL control information 114 that may schedule resources for UL packet transmissions. UL control information 118 may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 314 may be configured to carry system information blocks (SIBs), carrying information that may enable access to a given carrier.

The channels or carriers described above and illustrated in FIGS. 1, 3, and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

In an OFDM carrier, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
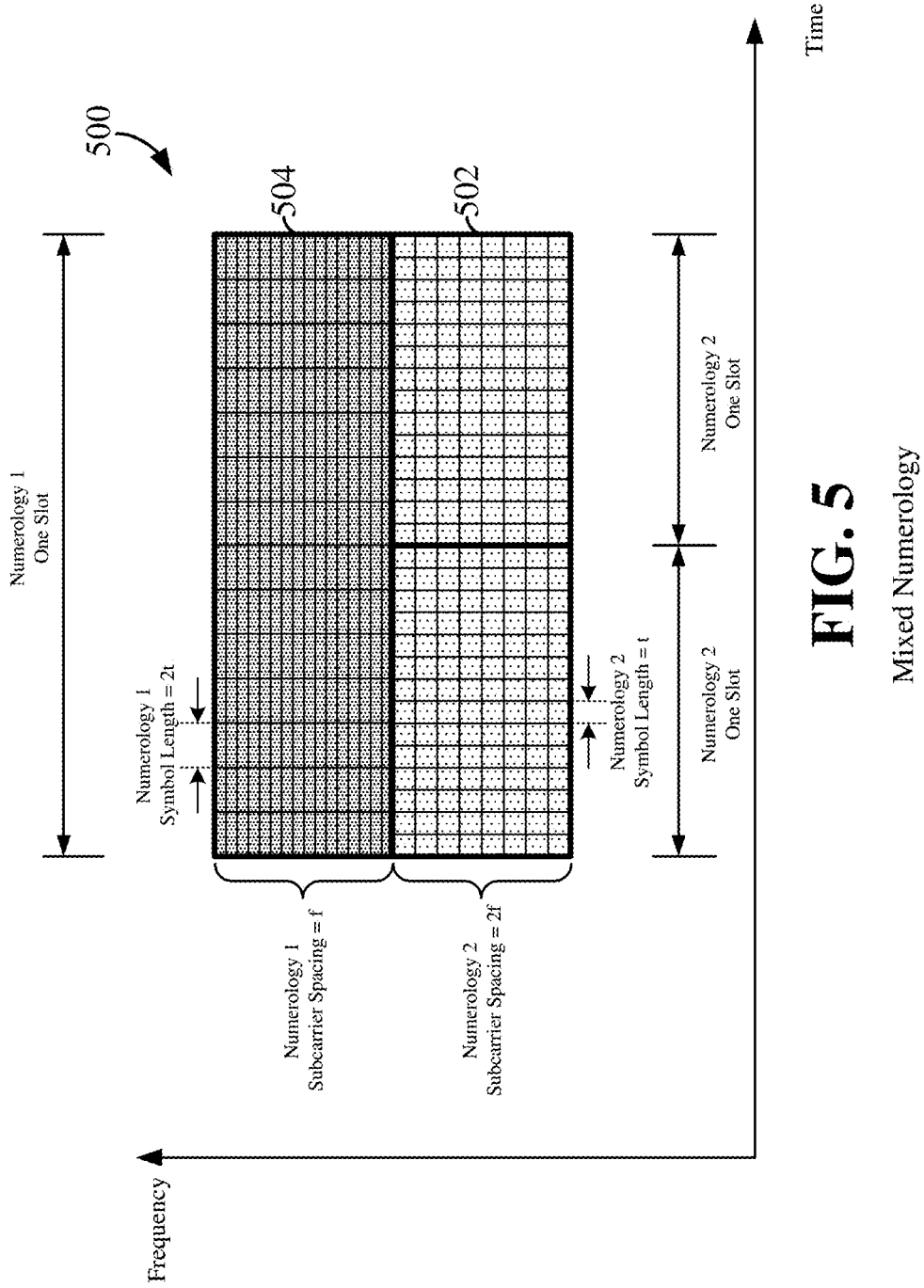
FIG. 5 is a schematic illustration of time-frequency resources on a carrier utilizing OFDM with a mixed numerology.

FIG. 5 is a schematic illustration of a mixed-numerology carrier 500, multiplexing OFDM waveforms of two different numerologies utilizing FDM. In this example, a first subband 502 may have a first subcarrier spacing (SCS) of 2f, and a symbol duration of t. Further, a second subband 504 may have an SCS of half that of the first subband 502, or 2f/2=f. In one non-limiting example, the subcarrier spacing f of the first numerology may be 30 kHz, and the subcarrier spacing 2f of the second numerology may be 60 kHz. As discussed above, because the SCS is reduced in the second subband 504, the symbol duration in that subband 504 is correspondingly increased. Thus, in the second subband 504, the numerology includes a symbol duration of twice that of the first subband 502, or 2t.

In various examples, different UEs 106 may utilize different CPs, such as a normal CP (NCP) and an extended CP (ECP), generally under the control of the scheduling entity 108. Because the CP is part of the OFDM symbol, within the present disclosure, any reference to a different numerology may refer to communication with different tone spacings and corresponding different symbol lengths, encompassing potentially different CPs within the different symbol lengths.

As illustrated in FIG. 5, even within the same slot, and on the same carrier, different UEs 106 may be assigned REs having different numerologies when the different numerologies are FDM with one another. Thus, transmission on the DL from the scheduling entity 108 may be a mix or multiplexing of these different waveforms, constituting the mixed-numerology carrier 500.

By supporting multiple numerologies, a RAN 104 can support multiple mixed-use cases, e.g., for different types of UEs, UEs with different requirements, UEs running different services, etc. As one example, a UE 106 utilizing a service that requires very low latency may better achieve that goal with a shorter slot length. Accordingly, that UE may be allocated resources in a numerology that has shorter symbol durations. In another example, a mixed-numerology carrier may provide for traffic offloading from a given set of resources. That is, as described further below, when resources corresponding to a first numerology become highly or fully occupied, then a scheduling entity 108 may be enabled to redirect one or more scheduled entities 106 to utilize resources of a second numerology. In another example, a scheduling entity 108 may redirect scheduled entities 106 for load balancing, e.g., to better balance traffic in different portions of the mixed-numerology carrier. Thus, a scheduling entity 108 may be enabled to redirect a subset of UEs camped on that cell onto a second numerology, while maintaining communication with another subset of one or more UEs using the first numerology.

When a carrier supports multiple numerologies, each numerology may provide a control channel, corresponding to data and traffic channels that utilize that numerology. However, this need not always be the case. In some examples, where a UE 106 is capable of utilizing resources with different numerologies, a common control channel may be utilized for each of a plurality of numerologies.

Further aspects of the disclosure will now be described in relation to a mixed-numerology carrier 600 illustrated schematically in FIG. 6. This illustration provides a block or group of time-frequency resources in an OFDM waveform having two different numerologies multiplexed onto the mixed-numerology carrier 600. In this example, for illustrative purposes all the slots shown on the carrier 600 are DL slots, including DL control and DL data regions. However, it is to be understood that other examples may include both DL and UL regions in a TDD carrier, without deviating from the scope of the present disclosure.

As illustrated, each numerology includes a set of slots, and each slot includes a common DL control region and a data region, as described above in relation to the slot 310 illustrated in FIG. 3. Of course, any other suitable slot structure may be utilized in a given example, and the structure of a slot in a given implementation may differ from the examples in FIG. 6.

Although two numerologies are multiplexed onto the carrier 600 in the illustrated example, those of ordinary skill in the art will recognize that in other examples, any suitable number of numerologies may be multiplexed onto a given mixed-numerology carrier. In the illustrated example, the subcarrier spacings of the different numerologies differ from one another. For example, in a first numerology 602, the subcarrier spacing may be 60 kHz, while in a second numerology 604, the subcarrier spacing may be 30 kHz. Because there may be 14 symbols per slot, a slot in the second numerology 604 is double the length of a slot in the first numerology 602. Thus, this figure shows four slots for the first numerology 602, and two slots for the second numerology 604.

Each numerology 602 and 604 on the carrier 600 includes a plurality of slots. Among these slots, the first numerology 602 includes a first slot 608, and the second numerology 604 includes a second slot 612. Further, within each numerology 602 and 604, each slot includes a common DL control region and a data region. For example, the first slot 608 of the first numerology 602 includes a common DL control region 606, and the second slot 612 of the second numerology 604 includes a common DL control region 610. In the described examples, the common DL control regions 606 and 610 within slots 608 and 612 may include control information, e.g., carried on a PDCCH. This control information may include a scheduling grant for resources on a shared traffic channel for that slot, such as a PDSCH. In the illustrated example, each slot's control region (e.g., control regions 606, 610, etc.) has the same, fixed bandwidth. In this way, a scheduling entity may provide a certain set of control information at a consistent, predictable location within the carrier 600. Further, a scheduling entity can provide for compatibility with a broad range of UE types by suitably locating, and limiting the bandwidth of the control regions 606, 610, etc. That is, even UEs that lack the radio capabilities to receive wide-bandwidth signal signals can receive a relatively narrowband common control channel. Similarly, even UEs that are only capable of receiving transmissions within a small portion of the full frequency range of the carrier 600 can receive a suitably located common control channel.

Each slot may further include a data region, which may carry DL data or DL traffic for a plurality of UEs. That is, traffic channels in the data region of a given slot may be shared by a plurality of UEs. For example, the DL data regions may include the PDSCH, scheduled according to the control information, e.g., carried on the PDCCH in that respective slot.

Figure 6:
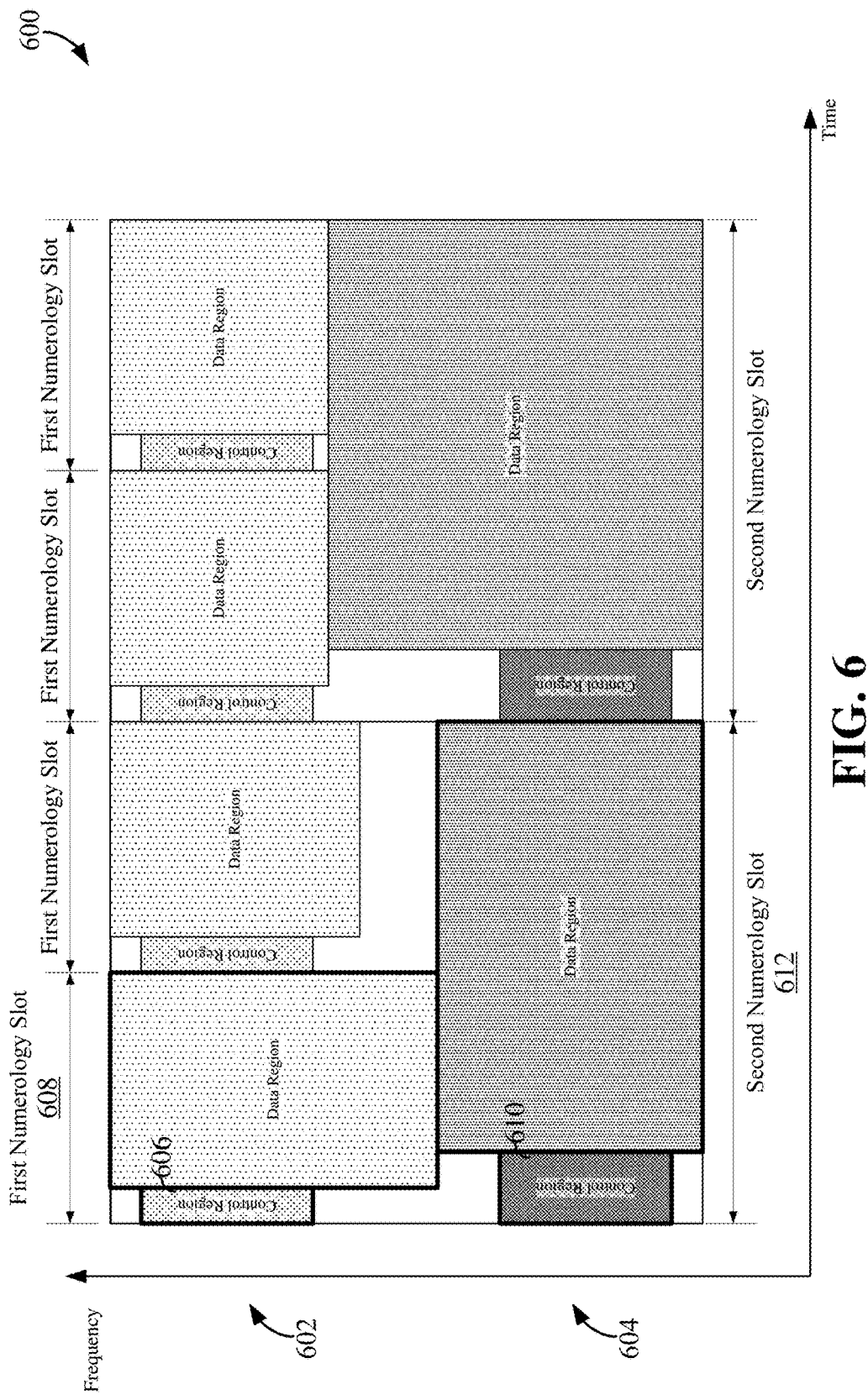
FIG. 6 is a schematic illustration of time-frequency resources on a carrier utilizing OFDM with a mixed numerology and with flexible system bandwidths.

As illustrated in FIG. 6, the data region of any given slot may have a different bandwidth than the control region of that same slot. Moreover, the bandwidth of the data regions in different slots may differ, and may vary from one slot to another. In some examples, the DL control information carried in the common control region (e.g., 606 and 610) of a given slot may direct high-capability UEs to receive very wideband downlink traffic, and/or traffic in resource elements outside the frequency range occupied by the common control region. The DL control information may additionally direct low-capability UEs to receive DL traffic within a portion of the data region that occupies frequencies within the same range as the common control region.

With this degree of flexibility in the bandwidth of the respective slots' data regions, in a mixed-numerology carrier 600, different numerologies may dynamically share resources, with their share varying over time. As illustrated in FIG. 6, when the bandwidth of data regions in the first numerology 602 is wider, the bandwidth of data regions in the second numerology 604 is narrower; and when the bandwidth of data regions in the first numerology 602 is narrower, the bandwidth of data regions in the second numerology 604 is wider. In some examples, including the example illustrated in FIG. 6, the data portion of a slot of one numerology may be configured not to overlap any portion of a slot of a different numerology. For example, a wide bandwidth PDSCH of the first numerology 602 may only be as wide as possible where it does not overlap with the control region or the data region of a slot of the second numerology. However, this is not intended to be a limiting example, and in other examples, transmissions of one numerology may overlap transmissions of another numerology.

In the illustrated example, some regions of the mixed-numerology 600 are unused. That is, the resources between the control region 606 of the first slot 608 of the first numerology 602, and the control region 610 of the first slot 612 of the second numerology 604 are unused. However, in some examples according to an aspect of the present disclosure, these resources may be filled with any suitable transmissions.

In the illustrated mixed-numerology carrier 600, within each slot, the control region shares the same numerology as its corresponding data region. However, this need not necessarily be the case, and in some examples, a control region of a given slot may have a different numerology than a traffic region of that same slot.

Figure 7:
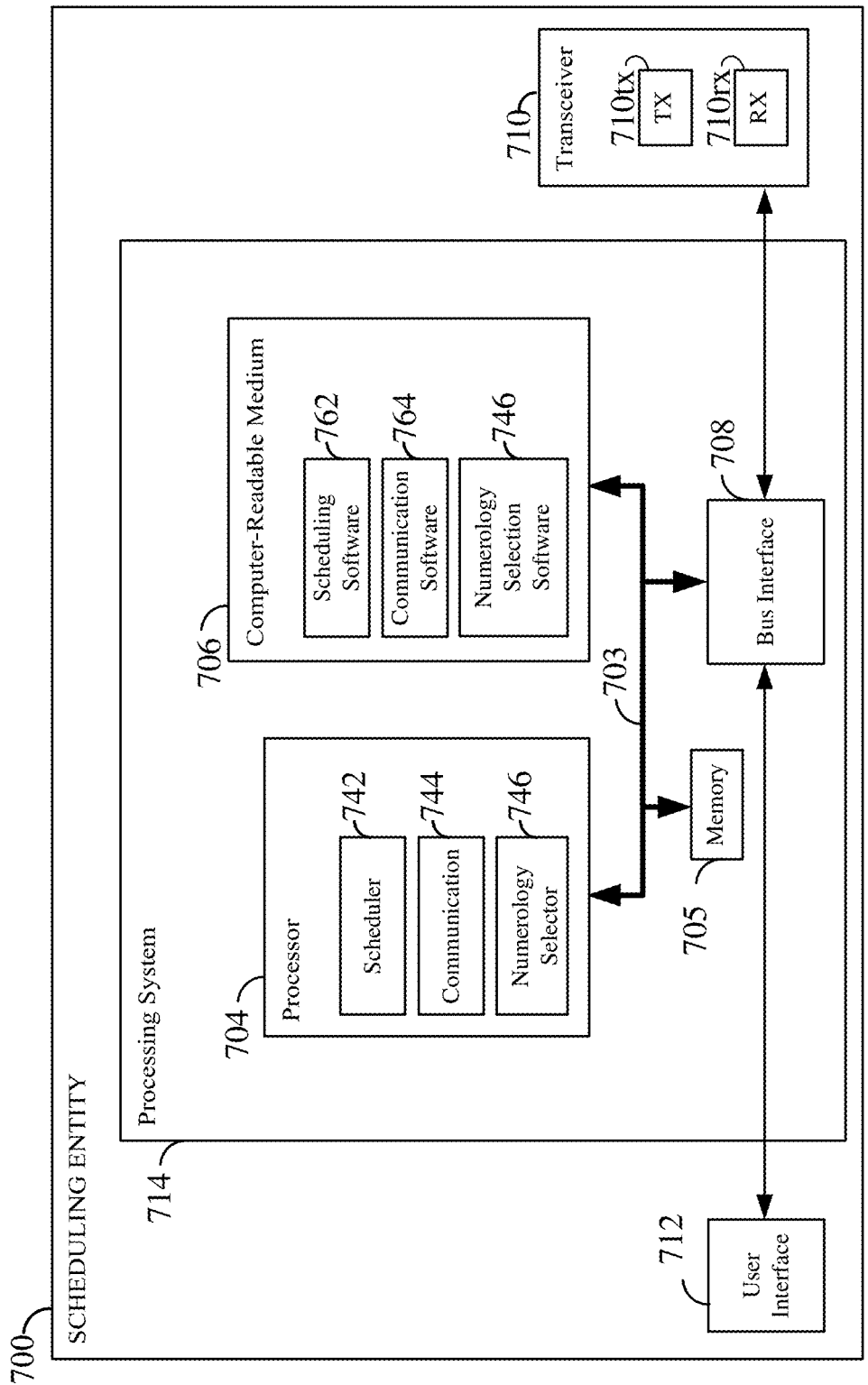
FIG. 7 is a block diagram illustrating an example of a hardware implementation for a scheduling entity employing a processing system.

FIG. 7 is a block diagram illustrating an example of a hardware implementation for a scheduling entity 700 employing a processing system 714. For example, the scheduling entity 700 may be a user equipment (UE) as illustrated in any one or more of FIGS. 1 and/or 2. In another example, the scheduling entity 700 may be a base station as illustrated in any one or more of FIGS. 1 and/or 2.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below and illustrated in FIGS. 9, 11, 13, and/or 14.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include a scheduler 742 configured for various functions, including, for example, scheduling time-frequency resources for one or more scheduled entities. In further aspects, the processor 704 may include communication circuitry 744 configured for various functions, including, for example, controlling wireless communication utilizing the transceiver 710, receiving data and control channels via receiver 710*rx*, and transmitting data channels, control channels, sync signals (SS's), SIBs, MIBs, etc., via transmitter 710*tx*. In still further aspects, the processor 704 may include a numerology selector 746 configured for various functions, including, for example, configuring the transceiver 710 to provide support for a given numerology, as needed.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include scheduling software 762 configured for various functions, including, for example, scheduling time-frequency resources for one or more scheduled entities. In further aspects, the computer-readable storage medium 706 may include communication software 764 configured for various functions, including, for example, controlling wireless communication utilizing the transceiver 710, receiving data and control channels via receiver 710*rx*, and transmitting data channels, control channels, sync signals (SS's), SIBs, MIBs, etc., via transmitter 710*tx*. In still further aspects, the computer-readable storage medium 706 may include numerology selection software 746 configured for various functions, including, for example, configuring the transceiver 710 to provide support for a given numerology, as needed.

Figure 9:
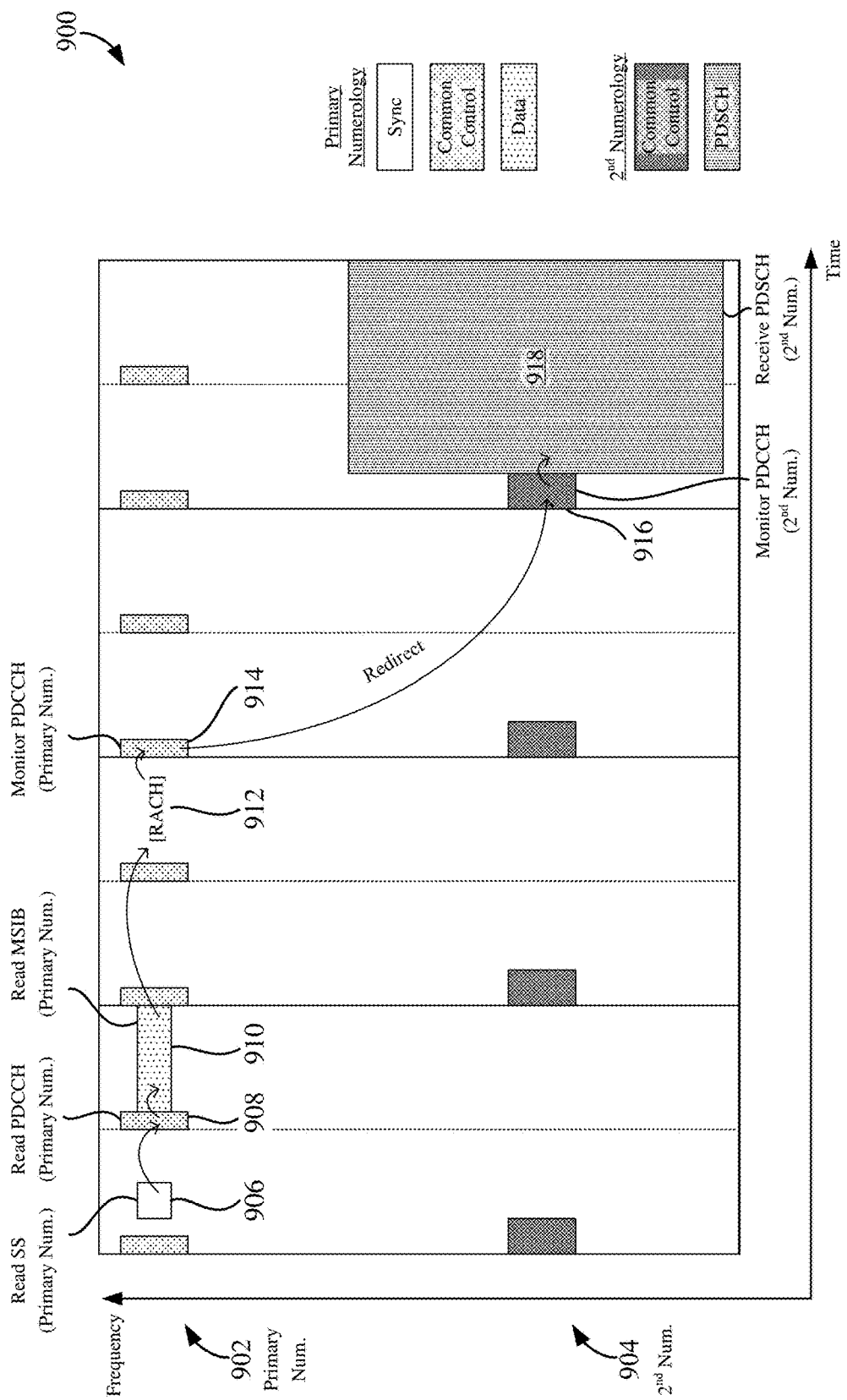
FIG. 9 is a schematic illustration of time-frequency resources on a carrier utilizing OFDM with a mixed numerology and a single SS.
Figure 11:
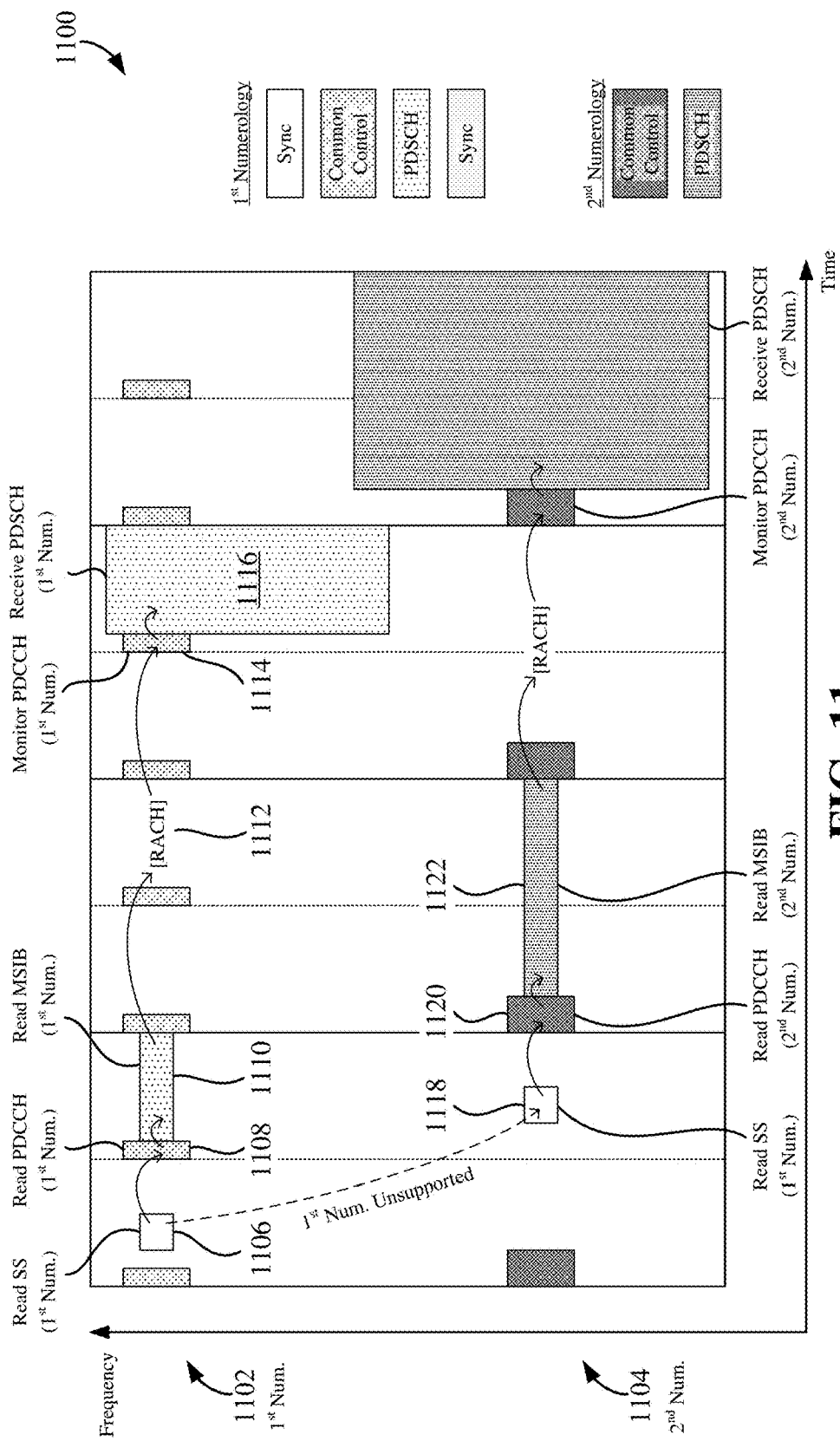
FIG. 11 is a schematic illustration of time-frequency resources on a carrier utilizing OFDM with a mixed numerology and multiple SS's having the same numerology.
Figure 13:
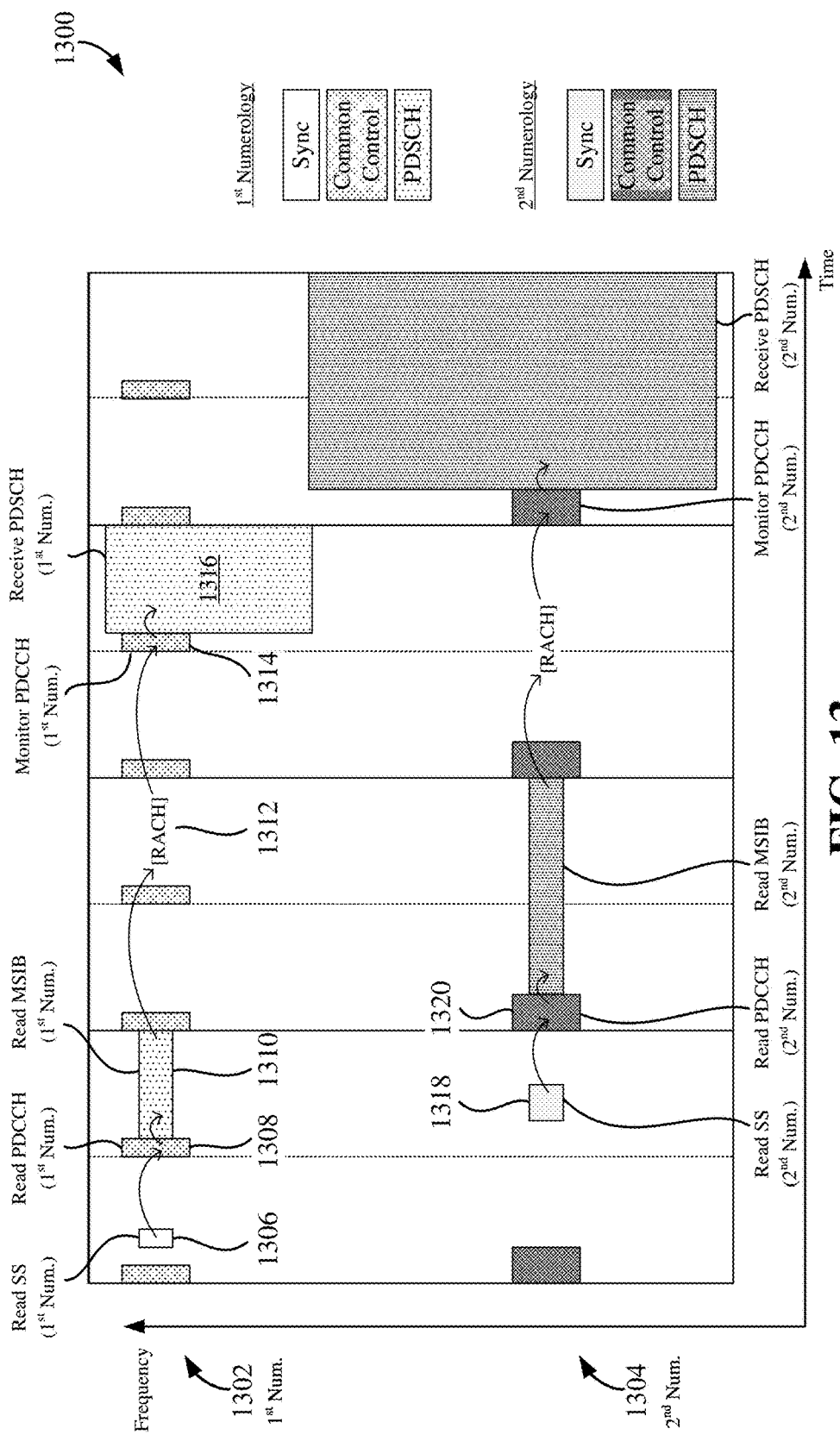
FIG. 13 is a schematic illustration of time-frequency resources on a carrier utilizing OFDM with a mixed numerology and multiple SS's having different numerologies.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1 and/or 2, and utilizing, for example, the processes and/or algorithms described herein in relation to FIGS. 9, 11, 13, and/or 14.

Figure 8:
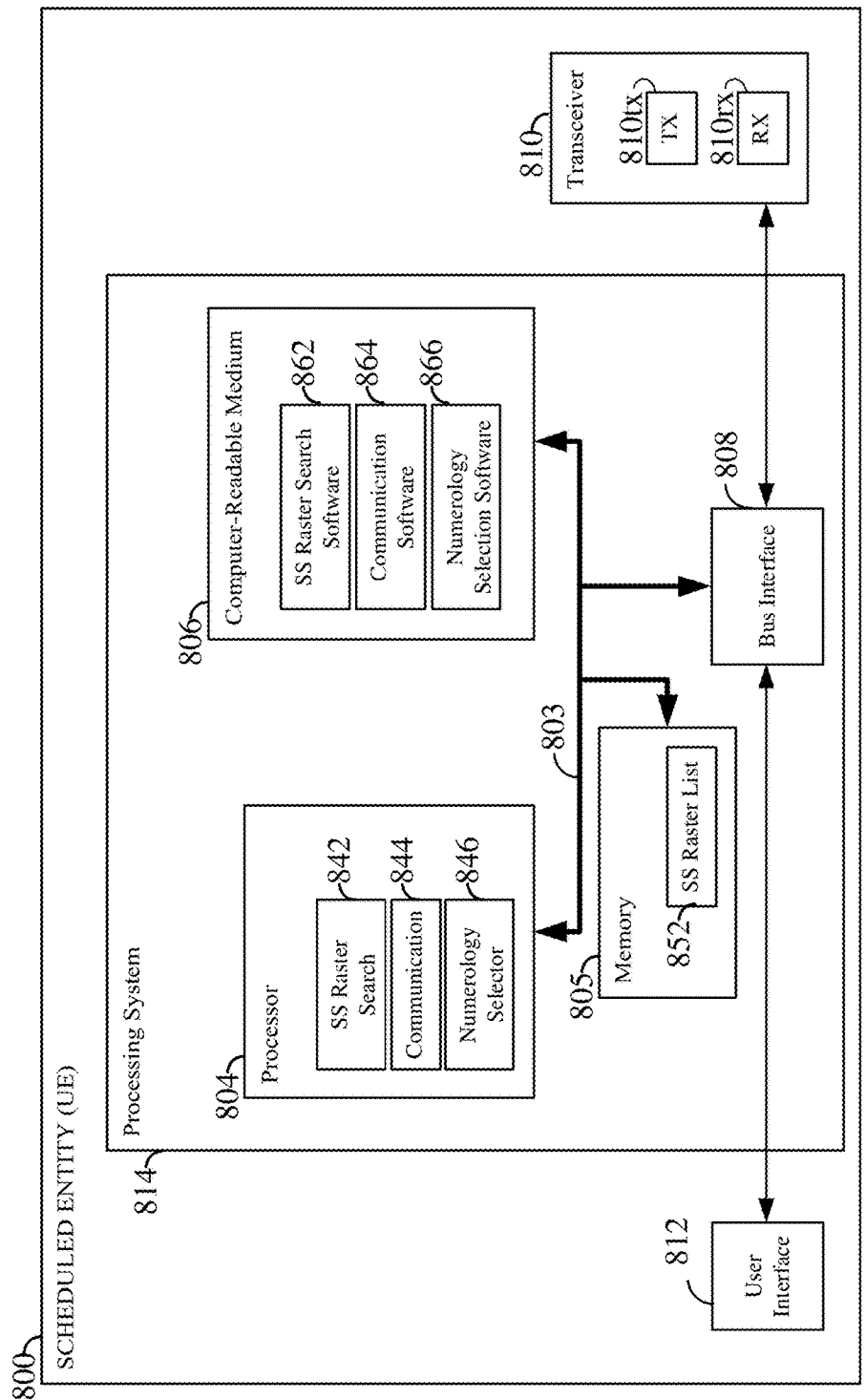
FIG. 8 is a block diagram illustrating an example of a hardware implementation for a scheduled entity employing a processing system.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1 and/or 2.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be used to implement any one or more of the processes described below and illustrated in FIGS. 9-13.

In some aspects of the disclosure, the processor 804 may include SS raster search circuitry 842 configured for various functions, including, for example, searching a carrier for an SS, detecting the SS in coordination with the receiver 810*rx*, the SS raster list 852, and the numerology selector 846; and/or redirecting from one channel to another, e.g., by suitably configuring the transceiver 810. In a further aspect, the processor 804 may include communication circuitry 844 configured for various functions, including, for example, controlling wireless communication utilizing the transceiver 810; receiving data and control channels via receiver 810rx, and transmitting data and control channels via transmitter 810tx. In a further aspect, the processor 804 may include a numerology selector 846 configured for various functions, including, for example, configuring and/or redirecting the transceiver 810 to provide support for a given numerology as needed.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1 and/or 2, and utilizing, for example, the processes and/or algorithms described herein in relation to FIGS. 9-13.

Referring now to FIG. 9, a mixed-numerology carrier 900 is schematically illustrated. As mentioned above, some aspects of the present disclosure provide for a mixed-numerology carrier that utilizes a single, common sync signal (SS) within the bandwidth of the carrier, for each of a plurality of numerologies. In this illustration, a single SS 906 is provided, to enable UE to access the carrier 900 on each of a plurality of numerologies 902 and 904.

In some examples of a mixed-numerology carrier, an SS need not necessarily have the same numerology as any control channel, data channel, or any other channel on the carrier. That is, within the scope of the present disclosure, any suitable combination of numerologies between SS's, control channels, and data channels may be utilized. However, in the description that follows, with reference to the mixed-numerology carrier 900 illustrated in FIG. 9, the carrier includes two numerologies, referred to as a primary numerology 902 and a second ($2^{nd}$) or secondary numerology 904. Further, the carrier 900 includes a single, common SS 906 within the bandwidth of the carrier 900, and having the primary numerology 902. That is, the primary numerology 902 may be referred to as primary because it is the numerology that carries the SS 906. In this example, the second numerology 904 may omit a sync channel.

Further, in FIG. 9, for ease of illustration, the SS 906 is shown in the same frequency range as other DL transmissions utilizing the primary numerology 902. However, this need not be the case. Other examples within the scope of the present disclosure may locate the SS 906, utilizing the primary numerology 902, within a frequency range outside the frequency range utilized by other transmissions that utilize the primary numerology 902.

Figure 10:
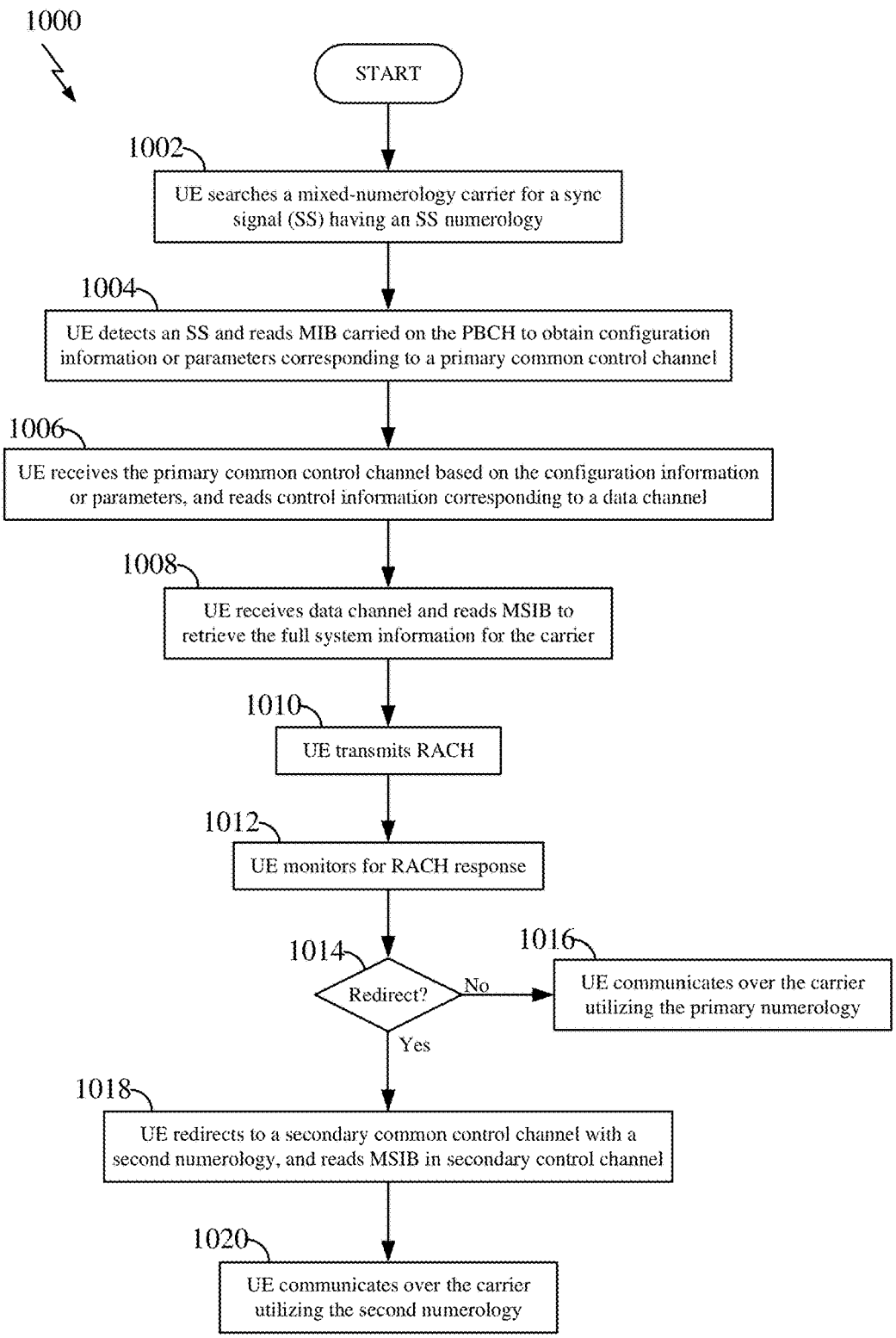
FIG. 10 is a flow chart illustrating an exemplary process for a UE to carry out communication utilizing the carrier illustrated in FIG. 9.

The operation of a UE or scheduled entity 800 acquiring the mixed-numerology carrier 900 will now be described with reference to FIGS. 9 and 10. FIG. 10 is a flow chart illustrating an exemplary process 1000 for a UE 800 to acquire a mixed-numerology carrier 900 in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 800 illustrated in FIG. 8. However, the process 1000 is not limited thereto. In other examples, the process 1000 may be carried out by any suitable apparatus or means for carrying out the functions or algorithm described below.

At block 1002, a UE 800 may search the mixed-numerology carrier 900 for a SS, having an SS numerology (e.g., the primary numerology 902). That is, to gain access to the information on the mixed-numerology carrier 900, a UE 800 may utilize an SS raster 842, in coordination with a stored SS raster list 852 (e.g., a list of hypotheses or candidate frequency locations) to scan or search for an SS in the carrier 900. The UE 800 may tune its receiver 810rx to attempt to receive a sync signal at a candidate frequency location in the air interface, re-tuning to the next candidate frequency until an SS is identified. As one non-limiting example, the SS raster list 852 may include approximately 5 or 6 candidate frequency locations to search for the SS within a 100 MHz bandwidth.

According to an aspect of the disclosure, for the SS search, the UE 800 may configure its receiver 810rx to scan for an SS at the primary numerology, independent of any other numerologies that the UE 800 may be configured to use. That is, by virtue of the carrier 900 including a single, common numerology for the SS 906, all UEs that seek to access the carrier 900 may search for an SS utilizing that common numerology.

At block 1004, during the search, the UE 800 may detect an SS 906 on the carrier 900. Once the SS 906 is detected, the UE 800 may read certain control information carried on the SS 906, including configuration information or parameters for a common control channel 908 using the primary numerology 902. That is, as described previously the SS 906 may carry a physical broadcast channel (PBCH). The PBCH may include broadcast control information such as a master information block (MIB) that provides various configuration information or parameters for one or more channels on the carrier, such as a common control channel (e.g., PDCCH) 908. In other words, the MIB in the SS 906 may map to a primary common control channel 908. In some aspects of the disclosure, the configuration information or parameters (e.g., the MIB) may include information sufficient for the UE 800 to access the carrier.

The configuration information or parameters carried on the MIB may include the location within the carrier 900, the bandwidth, and/or other information characterizing the primary common control channel 908. In some examples, the MIB may be limited to critical information required for a UE 800 to access the primary common control channel 908; in other examples, the MIB may include additional information for the UE 800. Further, in some examples, where the SS may not necessarily share a numerology with a control channel, the MIB may indicate the numerology of the primary common control channel on the carrier.

For each numerology 902, 904 on the mixed-numerology carrier 900, each slot may include a common control channel or common control region. Here, the common control channel corresponding to the numerology that includes the SS 906 may be referred to as the primary common control channel 908. Once the UE 800 reads the MIB from the SS 906 and is informed of the characteristics of the primary common control channel 908 (e.g., its location, bandwidth, numerology, etc.), the UE 800 may monitor for the primary common control channel 908.

Accordingly, at block 1006, the UE 800 may read the primary common control channel 908 to obtain information or parameters corresponding to a data channel 910. That is, in addition to user data or traffic that may be carried on a PDSCH, the data channel 910 may also carry system information block (SIB) information about the carrier 900. Thus, for example, the primary common control channel 908 may inform the UE 800 of resources on the carrier 900, within the data channel 910, which carry the SIBs. Accordingly, at block 1008, the UE 800 may read system information, or minimum SIB (MSIB) information, carried on the data channel, 910 to retrieve information sufficient for the UE 800 to access the carrier (e.g., the full system information for one or more numerologies on the mixed numerology carrier 900).

At block 1010, according to some examples, the UE 800 may gain access to data resources on the carrier 900 by utilizing a random access channel (RACH). A RACH procedure is well-known to those of ordinary skill in the art, and is not described in detail herein. Very simply, when the UE 800 has a need for communication resources, the UE 800 may make a RACH transmission utilizing resources within the carrier 900, which are defined in the MSIB. Because the illustration in FIG. 9 only shows DL signals, an UL RACH transmission as part of a random access procedure is not shown, but implied with the notation [RACH] 912. After making the RACH transmission 912, at block 1012, the UE 800 may monitor for a RACH response on the carrier 900. In some examples, as illustrated in FIG. 9, a RACH response may be located within a common control channel 914 in a slot subsequent to the RACH transmission 912.

The MSIB-RACH procedure is not intended to be limiting in nature. That is, in some examples, the MIB carried on the sync channel 906 (e.g., within the PBCH) may include sufficient information to enable the UE 800 to engage in a random access procedure. In such an example, the UE 800 may make a RACH transmission immediately after, or soon after reading the SS 906, e.g., prior to the MSIB 910.

In some examples, where a UE 800 would communicate utilizing the primary numerology 902, the common control channel 914 might include control information (e.g., a PDCCH) scheduling resources for that UE utilizing the primary numerology 902. However, according to a further aspect of the disclosure, the control information carried in the common control channel 914 may include a redirection indication, configured to redirect the UE 900 to the second numerology 904. For example, at block 1014, the UE 800 may determine whether the control information in the common control channel 914 includes a redirection indication, including information about a control channel having the second numerology 904. That is, the redirection indication may be configured to redirect the UE 800 to the second numerology 904. Such a redirection indication may be provided to the UE 800 utilizing any suitable control signaling, including but not limited to radio resource control (RRC) signaling carried on the DL common control channel 914. In another example (not illustrated), a redirection indication may be provided to the UE 800 on the PDSCH. In this example, the location of the redirection indication within the data region of a slot may be provided to the UE 800 in scheduling information, or a grant, in the DL common control channel 914. A redirection request, or redirection indication, may include information about a second common control channel 916, such as its location on the carrier 900, its numerology, and/or any other suitable information.

If the UE 800 is not redirected, then at block 1016, the UE 800 may communicate over the mixed-numerology carrier 900, remaining on the primary numerology 902. That is, the UE 800 may maintain a configuration of its transceiver 810 to communicate over the mixed-numerology carrier 900 utilizing the primary numerology. However, if the UE 800 receives a redirection indication, then at block 1018, the UE 800 may redirect to a secondary common control channel 916, having the second numerology 904.

In some examples, the secondary common control channel 916 may use a different numerology (e.g., the second numerology 904) than that of the primary common control channel 914 (the primary numerology 902). In an example where the secondary common control channel 916 is a different numerology than that of the primary common control channel 914, the UE 800 may be informed of the numerology of the secondary common control channel 916 via control information in the primary control channel 914, via the MSIB carried in a data channel 910, or via any other suitable channel or signal. When the UE 800 is redirected to the secondary common control channel 916 having a different numerology, the UE 800 may alter, or change a configuration of its receiver 810$rx$ and/or its transmitter 810$tx$ to monitor for control information on the secondary common control channel 916.

In other examples, the secondary common control channel 916 may use the same numerology as that of the primary common control channel 914.

Once the UE 800 redirects to the secondary common control channel 916, at block 1020, the UE 800 may receive the secondary common control channel 916. The secondary common control channel 916, and/or a secondary data channel 918, may carry system information (e.g., SIB s) corresponding to one or more channels having the second numerology 904. That is, the secondary common control channel 916 may include information to direct the UE 800 to locate a secondary MSIB corresponding to the second numerology 904 within a data region 918, similar to the procedure described above for the primary numerology 902, at block 1008. However, in another example, the secondary common control channel 916 need not necessarily direct the UE 800 to a secondary MSIB. That is, the system information carried in the data channel 910 in the primary numerology 902 may provide system information characterizing the second numerology 904, e.g., the secondary common control channel 916. In either case, the UE 800 may read SIBs corresponding to an MSIB to obtain the system information corresponding to the second numerology 904.

In some examples, second system information for the second numerology 904 may differ from the system information from the MSIB corresponding to the primary numerology 902. For example, the second system information for the second numerology 904 may indicate a different numerology for the PDSCH for a given slot than that of the secondary control channel 916. The second system information may further indicate a different bandwidth for a secondary data channel 918 (e.g., a PDSCH). That is, the bandwidth of the secondary data channel 918 may differ from that of the secondary common control channel 916, and the bandwidth of the secondary data channel 918 in one numerology may differ from the bandwidth of a data channel in another numerology. Furthermore, the bandwidth of data channels in a given numerology may vary from slot to slot, on a dynamic basis. In some examples, the system information may include information to enable an overlapping between resources for one or more channels of different numerologies.

After the UE 800 is redirected to the secondary common control channel 916, and obtains system information for the second numerology 904, at block 1018, the UE 800 may monitor the secondary common control channel 916 to obtain any grant for a data channel 918 (e.g., a downlink data channel PDSCH).

In some examples, the secondary downlink data channel 918 may use the second numerology 904. That is, a slot having the secondary control channel 916 of the second numerology 904 may remain with the same second numerology in its data portion 918.

In a further aspect of the disclosure, a redirection to a second numerology does not preclude an advanced UE 800 from monitoring more than one numerology at the same time. That is, such an advanced UE 800, when it receives such a redirection indication, may simply add the secondary control channel 916 to a list of control channels to monitor on the mixed-numerology carrier 900, while still monitoring the primary control channel 908 at the primary numerology 902.

As mentioned above, another aspect of the disclosure provides for multiple numerologies to be multiplexed onto a mixed-numerology carrier, where each numerology has its own respective SS. In this example, by utilizing a single, common numerology for SS's at all numerologies within a mixed-numerology carrier 1100, a network may be enabled to add new numerologies over time without affecting compatibility with legacy UEs.

FIG. 11 is a schematic illustration of an illustrative example of a mixed-numerology carrier 1100, which multiplexes communications with different numerologies 1102 and 1104, according to one aspect of the present disclosure. In the example illustrated in FIG. 11, a first numerology 1102 is multiplexed with a second numerology 1104 within a single carrier 1100 utilizing FDM. However, unlike the example described above with a single SS, in this illustration, multiple SS's may be transmitted on the carrier 1100. For example, a first SS 1106 may be transmitted for the first numerology 1102, and a second SS 1118 may be transmitted for the second numerology 1104. In the particular example of FIG. 11, the first SS 1106 and the second SS 1118 each use the same numerology as one another (e.g., the first numerology). That is, in some aspects of the disclosure, a single, common SS numerology may be utilized for each of a plurality of SS's 1106 and 1118, wherein the respective SS's 1106 and 1118 map to different respective common control channels 1108 and 1120.

Furthermore, the respective common control channels 1108 and 1120 may have different numerologies from one another, and/or different numerologies than their respective SS 1106, 1118. Thus, to gain access to the carrier 1100, for any given numerology, a UE 800 may search for an SS with a given (e.g., predetermined) SS numerology.

Figure 12:
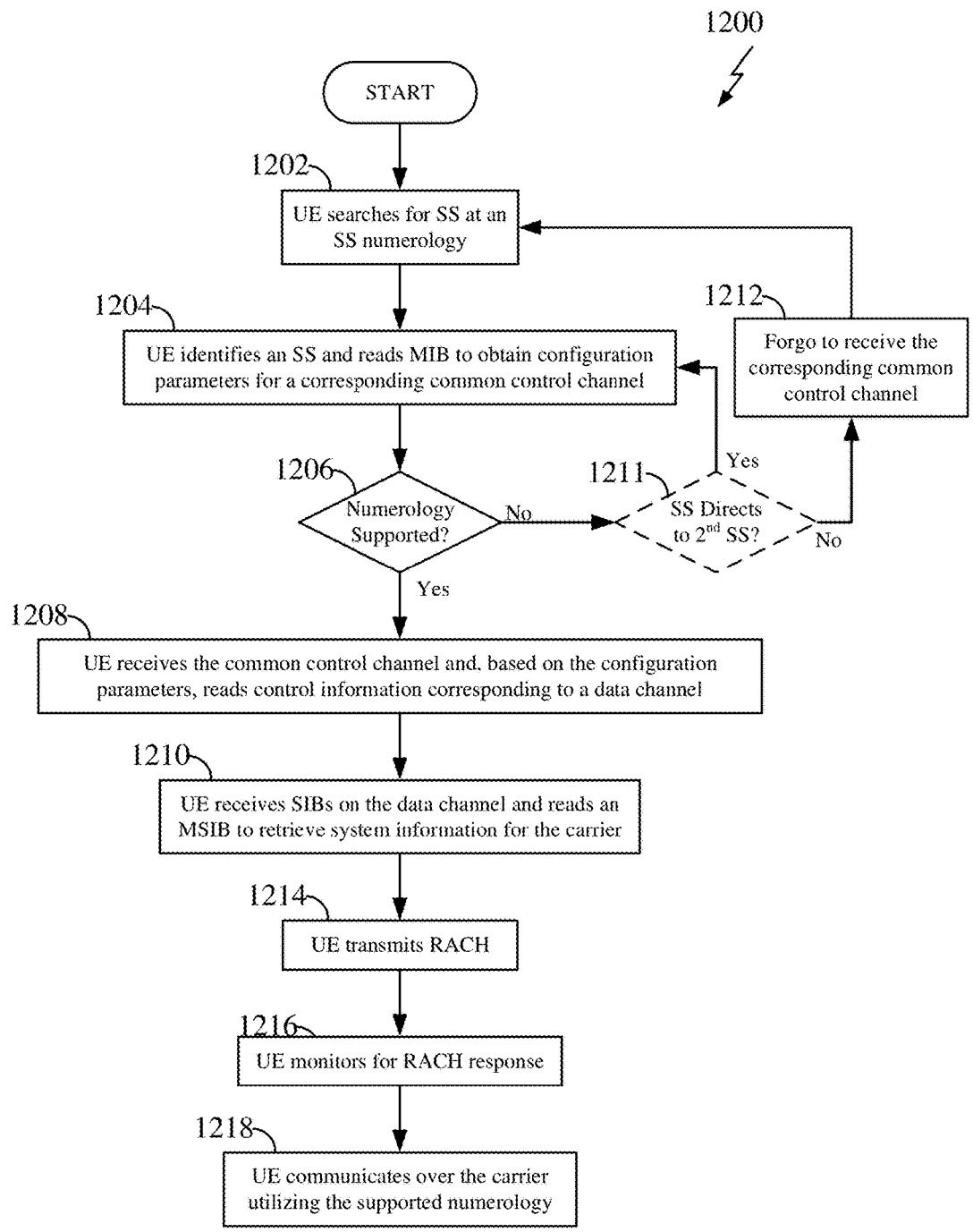
FIG. 12 is a flow chart illustrating an exemplary process for a UE to carry out communication utilizing the carrier illustrated in FIG. 11.

The operation of a UE or scheduled entity 800 acquiring the mixed-numerology carrier 1100 will now be described with reference to FIGS. 11 and 12. FIG. 12 is a flow chart illustrating an exemplary process 1200 for a UE 800 to acquire a mixed-numerology carrier 1100 in accordance with some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 800 illustrated in FIG. 8. However, the process 1200 is not limited thereto. In other examples, the process 1200 may be carried out by any suitable apparatus or means for carrying out the functions or algorithm described below.

At block 1202, a UE 800 may search the mixed-numerology carrier 1100 for an SS, having the SS numerology. That is, to gain access to the information on the mixed-numerology carrier 1100, a UE 800 may utilize an SS raster 842, in the same way as described above with respect to FIGS. 9-10. Similar to the example described above in FIGS. 9-10, by virtue of the carrier 1100 including a single, common numerology for the SS's 1106 and 1118, all UEs that seek to access the carrier 1100 may search for an SS utilizing that common SS numerology.

At block 1204, during the search, the UE 800 may identify a first SS, e.g., SS 1106. Once the first SS 1106 is identified, the UE 800 may read control information such as a MIB carried on a PBCH on the SS 1106. This control information may include configuration information or parameters for a first common control channel 1108, such as its location, its bandwidth, its numerology, etc. That is, as in the single SS example described above in relation to FIGS. 9-10, here, an SS 1106 may include a MIB that maps to a common control channel 1108. However, unlike the single SS example described above, in a further aspect of the disclosure, there is no primary and secondary common control channel. That is, each control channel 1108 and 1120, and each numerology 1102 and 1104, may essentially be on equal footing with its own SS 1106 or 1118, each having a respective MIB that maps to a corresponding common control channel 1108 or 1120.

In this example, because a plurality of SS's 1106 and 1118 share the same SS numerology, but those SS's may not correspond to communication slots with the same numerology, the UE 800 may not know which numerology communication channel it has located in its search. The MIB in the first SS 1106 may indicate a numerology for that SS's corresponding common control channel 1108. Here, as illustrated in FIG. 11, the common control channels 1108 and 1120 may have different numerologies from one another. Any other suitable differences may exist as well within different MIBs.

Thus, when the UE 800 identifies an SS via its search, such as the first SS 1106, the UE 800 may read its MIB to obtain configuration information or parameters for the corresponding common control channel 1108, including, for example, its numerology.

In an aspect of the disclosure, at block 1206, the UE 800 may determine whether it supports the numerology of the common control channel 1108 corresponding to the identified SS 1106. For example, if the MIB carried in the SS 1106 indicates a numerology that the UE 800 does not support, then at block 1212, the UE 800 may forgo to receive the common control channel 1108 corresponding to the identified SS 1106, and return to block 1202, continuing to search the carrier for another SS. In another aspect of the disclosure, the SS 1106 may include information about the location of one or more other SS's in the mixed-numerology carrier 1100. In this way, if the UE 800 does not support the numerology indicated in the identified SS 1106, the UE 800 may not be required to resume its search for another SS within the mixed-numerology carrier 1100. Rather, at optional block 1211, the UE 800 may easily direct to the second SS (e.g., SS 1118) based on the information contained in the received SS 1106, and the process may proceed to block 1204, as described above.

When the UE 800 finds a numerology it can support, then at block 1208, the UE 800 may utilize the configuration information or parameters received in the MIB to monitor the corresponding common control channel 1108. From that common control channel 1108, the UE 800 may obtain control information corresponding to a data channel, such as a grant or other information corresponding to SIBs in the data channel 1110. Accordingly, the UE 800 may receive the data channel 1110 and may read the MSIB to retrieve the full system information.

In a further aspect of the disclosure, different system information from different MSIBs in different traffic channels 1108 and 1122 may specify the same channel within the carrier 1100, but with different numerologies. That is, the same resources within the mixed-numerology carrier 1300 may be handled as having different numerologies by different UEs in the cell that acquired the different respective SS's.

As with the above examples, once the UE 800 obtains the system information, at block 1214 the UE 800 may gain access to the carrier 1100 through a RACH procedure 1112, utilizing resources defined in the MSIB. After making the RACH transmission 1112, at block 1216, the UE 800 may monitor for a RACH response on the carrier 1100. In some examples, as illustrated in FIG. 11, a RACH response may be located within a common control channel 1114 in a slot subsequent to the RACH transmission 1112. Subsequently, at block 1218, the UE 800 may communicate over the carrier 1100 utilizing the supported numerology (e.g., the first numerology 1102), e.g., by receiving a grant in the DL control channel 1114, identifying resources in a corresponding data channel (e.g., PDSCH) 1116; and subsequently, receiving DL data in the identified PDSCH resources.

In a further aspect of the disclosure, a scheduling entity 700 may still redirect a UE 800 to a different numerology, e.g., through RRC signaling as described above in relation to FIGS. 9-10 corresponding to the single, common SS example, if there is need (e.g., for offloading or load balancing).

As mentioned above, another aspect of the disclosure provides for multiple numerologies to be multiplexed onto a mixed-numerology carrier, where each numerology has its own respective SS, and where the respective SS's have different numerologies than one another.

FIG. 13 is a schematic illustration of an illustrative example of a mixed-numerology carrier 1300, which multiplexes communications with different numerologies 1302 and 1304, according to a further aspect of the present disclosure. In the example illustrated in FIG. 13, a first numerology 1302 is multiplexed with a second numerology 1304 within a single carrier 1300 utilizing FDM. However, unlike the examples described above, in this illustration, multiple SS's having different numerologies may be transmitted on the carrier 1300. For example, a first SS 1306 may be transmitted for the first numerology 1302, and a second SS 1318 may be transmitted for the second numerology 1304. In the particular example of FIG. 13, the first SS 1306 uses the first numerology 1302, and the second SS uses the second numerology 1304. Furthermore, the first SS 1306 maps to a first common control channel 1308 using the first numerology 1302, and the second SS 1318 maps to a second common control channel 1320 using the second numerology 1304. Thus, to gain access to the carrier 1300, a UE 800 may search for an SS using a selected numerology from among a plurality of numerologies on the mixed-numerology carrier 1300.

Figure 14:
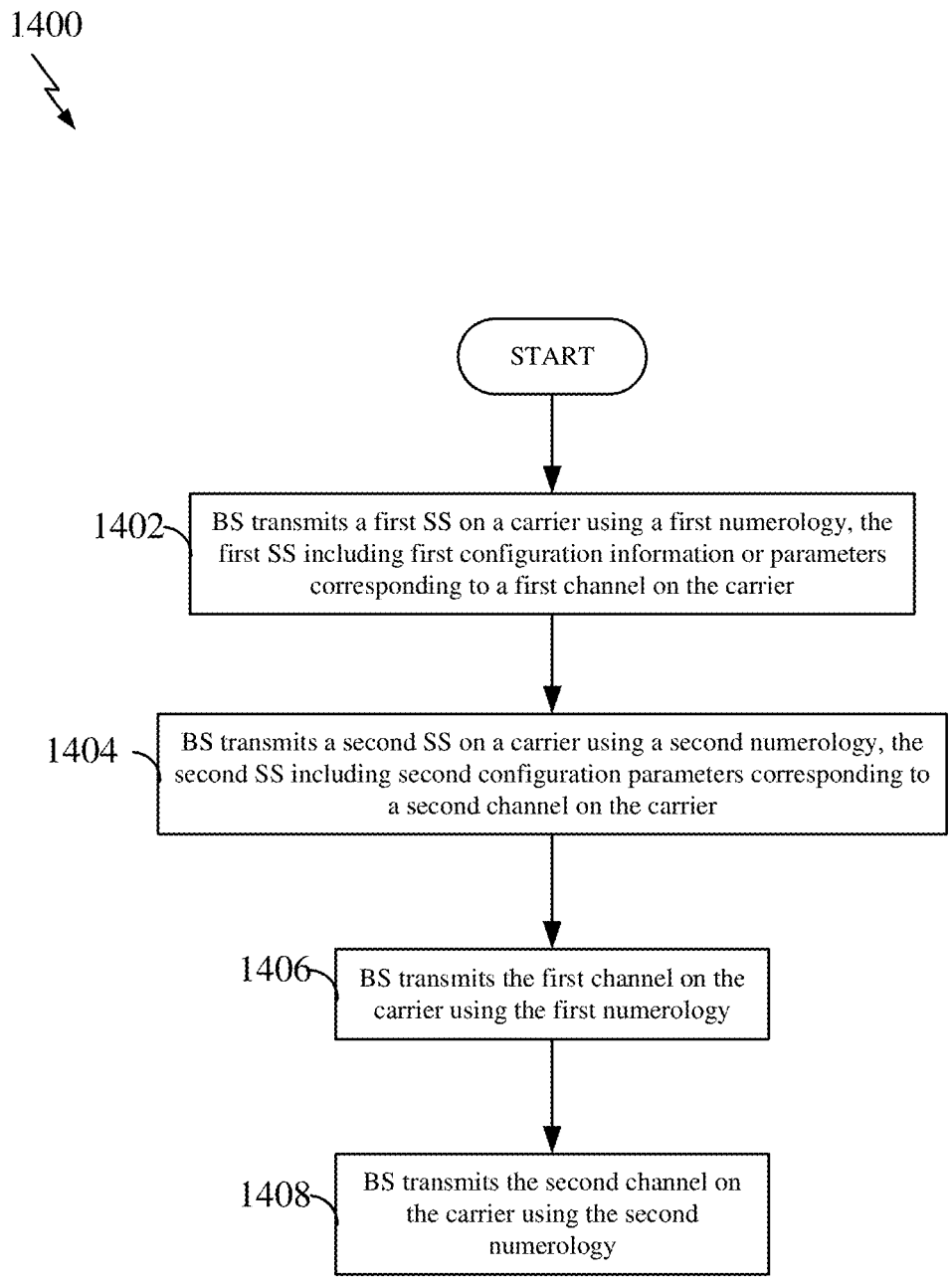
FIG. 14 is a flow chart illustrating an exemplary process for a base station to carry out communication utilizing the carrier illustrated in FIG. 13.

The operation of a base station or scheduling entity 700 transmitting the mixed-numerology carrier 1300 will now be described with reference to FIGS. 13 and 14. FIG. 14 is a flow chart illustrating an exemplary process 1400 for a base station 700 to transmit a mixed-numerology carrier 1300 in accordance with some aspects of the disclosure. As described below, some or all illustrated features may be omitted in a particular implementation within the scope of the present disclosure, and some illustrated features may not be required for implementation of all embodiments. In some examples, the process 1400 may be carried out by the scheduling entity 700 illustrated in FIG. 7. However, the process 1400 is not limited thereto. In other examples, the process 1400 may be carried out by any suitable apparatus or means for carrying out the functions or algorithm described below.

At block 1402, the scheduling entity 700 may transmit a first SS 1306 using a first numerology 1302 on a mixed-numerology carrier 1300. Here, the first SS 1306 may include first configuration information or parameters corresponding to a first channel (e.g., a first common control channel) 1308 on the carrier 1300. At block 1404, the scheduling entity 700 may transmit a second SS 1318 using a second numerology 1304 on a mixed-numerology carrier 1300. Here, the second SS 1318 may include second configuration information or parameters corresponding to a second channel (e.g., a second common control channel) 1320 on the carrier 1300.

In this example, like the example of FIG. 11, each SS 1306 and 1318 may carry MIB information, and the MIB in different SS's may carry different information from one another. However, in this example shown in FIG. 13, the SS may not necessarily include information about the numerology of its corresponding common control channel That is, the numerology of the SS itself may map to the numerology of its corresponding common control channel, such that an explicit indication of the numerology of the common control channel may not be needed.

In this example, for a UE 800 to gain access to the carrier 1300, the UE 800 may be preconfigured for a preferred or supported numerology. Thus, the UE 800 may search for a particular SS in that preferred or supported numerology. When conducting the search, the UE 800 would not identify any SS with a numerology different from the preferred or supported numerology, and would only identify SS's with the preferred or supported numerology.

In an aspect of the disclosure, providing different SS's with different numerologies can enable placement of the respective SS's on different SS rasters, to speed up a UE's search. That is, SS's of different numerologies may be located in a different set of possible locations in the carrier 1300. Accordingly, a UE 800 searching for an SS of a particular numerology need only search for SS's having that particular numerology, reducing the scope of its search and potentially improving search speed.

In some examples, different (e.g., neighboring) base stations or scheduling entities 700 may transmit SS's of the same numerology, utilizing the same raster. In this way, neighbor cell monitoring may be eased for UEs, since a UE 800 may not be required to retune its receiver 810rx in order to monitor SS transmissions from a neighbor cell.

When a UE 800 identifies an SS 1306, the UE 800 may read a MIB carried on a PBCH, to obtain configuration information or parameters for a corresponding common control channel 1308. That is, the SS 1306 maps to a corresponding common control channel 1308 (e.g., a channel using the same numerology as the SS). With the MIB, the UE 800 may monitor the common control channel to obtain the control information corresponding to a data channel, such as a grant or other information corresponding to SIBs in the data channel 1310. Accordingly, the UE 800 may receive the data channel 1310 and may read the MSIB to retrieve the full system information.

In a further aspect of the disclosure, different system information from different MSIBs carried in different common control channels may specify the same traffic channel, with different numerologies. That is, the same resources within the mixed-numerology carrier 1300 may be handled as having different numerologies by different UEs in the cell that acquired the different respective SS's.

As in the above example, once the UE 800 obtains the system information, the UE 800 may gain access to the carrier 1300 via a RACH procedure 1312, utilizing resources defined in the MSIB. After making the RACH transmission 1312, the UE 800 may monitor for a RACH response on the carrier 1300. In some examples, as illustrated in FIG. 13, a RACH response may be located within a common control channel 1314 in a slot subsequent to the RACH transmission 1312. Subsequently, the UE 800 may communicate over the carrier 1300 utilizing the corresponding numerology (e.g., the first numerology 1302), e.g., by receiving a grant in the DL control channel 1314, identifying resources in a corresponding data channel (e.g., PDSCH) 1316; and subsequently, receiving DL data in the identified PDSCH resources.

In a further aspect of the disclosure, as in the single SS example described above, here, a scheduling entity 700 may redirect a UE 800 to different numerologies, e.g., through RRC signaling, for offloading or load balancing across numerologies.

Figure 15:
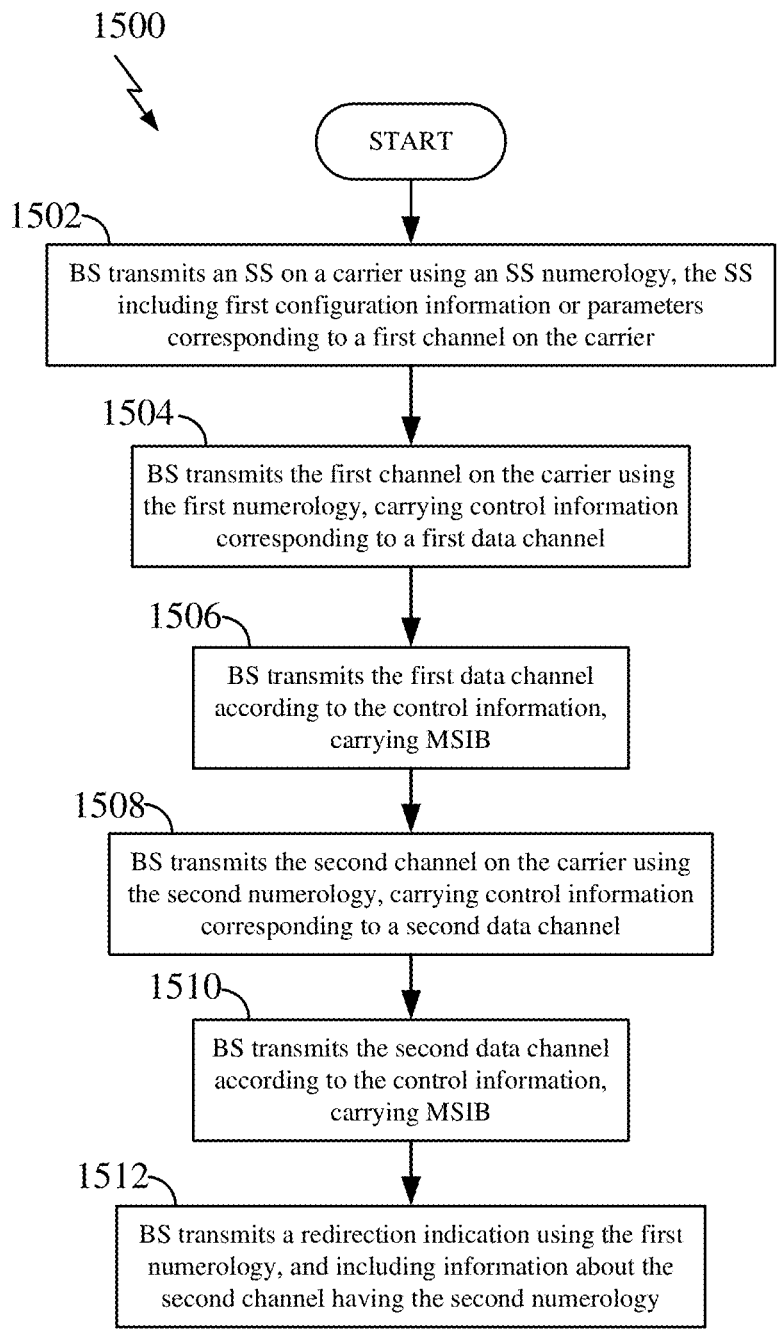
FIG. 15 is a flow chart illustrating another exemplary process for a base station to carry out communication utilizing a mixed-numerology carrier.

FIG. 15 is a flow chart illustrating an exemplary process 1500 for a base station 700 to transmit a mixed-numerology carrier in accordance with further aspects of the disclosure. As described below, some or all illustrated features may be omitted in a particular implementation within the scope of the present disclosure, and some illustrated features may not be required for implementation of all embodiments. In some examples, the process 1500 may be carried out by the scheduling entity 700 illustrated in FIG. 7. However, the process 1500 is not limited thereto. In other examples, the process 1500 may be carried out by any suitable apparatus or means for carrying out the functions or algorithm described below.

At block 1502, the scheduling entity 700 may transmit a first SS using a first numerology on a mixed-numerology carrier. Here, the first SS may include first configuration information or parameters corresponding to a first channel (e.g., a first common control channel) on the carrier. At block 1504, the scheduling entity 700 may transmit the first channel on the carrier, using a first numerology. Here, the first channel may carry control information corresponding to a first data channel on the carrier. Further, at block 1506, the scheduling entity 700 may transmit the first data channel according to the control information. Here, the first data channel may carry information sufficient for a UE to access the carrier (e.g., the MSIB).

At block 1508, the scheduling entity 700 may transmit the second channel (e.g., a second common control channel) using the second numerology. Here, the second channel may carry control information corresponding to a second data channel on the carrier. Further, at block 1510, the scheduling entity 700 may transmit the second data channel according to the control information. Here, the second data channel may carry information sufficient for a UE to access the carrier (e.g., the MSIB).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c"

is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) configured for wireless communication, comprising:
    a processor;
    a transceiver communicatively coupled to the processor;
    a memory communicatively coupled to the processor, wherein the processor is configured for:
        searching a single carrier for a sync signal (SS) having an SS numerology, wherein the single carrier comprises waveforms of a plurality of different numerologies including at least two of: the SS numerology, a first numerology, and a second numerology;
        detecting a first SS and reading first configuration information carried on the first SS, wherein the first configuration information corresponds to a first channel on the single carrier, and indicates that the first channel has the first numerology; and
        if the UE supports the first numerology, receiving the first channel, via the transceiver, based on the first configuration information, the first channel having the first numerology; and
        if the UE does not support the first numerology, forgoing to receive the first channel.

2. The UE of claim 1, wherein the SS numerology is the same as the first numerology, and wherein the second numerology differs from the SS numerology and the first numerology.

3. The UE of claim 1, wherein the SS numerology differs from the first numerology.

4. The UE of claim 1, wherein the UE supports the first numerology, and wherein the processor is further configured for:
    reading first control information on the first channel, the first control information corresponding to a first data channel on the single carrier; and
    receiving, via the transceiver, system information carried on the first data channel, the system information providing information sufficient for the UE to access the single carrier.

5. The UE of claim 1, wherein the UE supports both the first numerology and the second numerology, and wherein the processor is further configured for:
    receiving, via the transceiver, a redirection indication comprising information about a second channel having the second numerology on the single carrier;
    redirecting to the second channel; and
    receiving, via the transceiver, the second channel based on the redirection indication.

6. The UE of claim 1, wherein the UE does not support the first numerology, wherein the first SS further comprises information about a second SS on the single carrier, and wherein the processor is further configured for:
    reading second configuration information carried on the second SS, wherein the second configuration information corresponds to a second channel on the single carrier, the second channel having the second numerology, which differs from the first numerology.

7. The UE of claim 1, wherein the UE does not support the first numerology, and wherein the processor is further configured for:
    continuing the searching the single carrier for an SS;
    detecting a second SS and reading second configuration information carried on the second SS, wherein the second configuration information corresponds to a second channel on the single carrier, and indicates that the second channel has the second numerology; and
    if the UE supports the second numerology, receiving the second channel, via the transceiver, based on the second configuration information, the second channel having the second numerology.

8. The UE of claim 7, wherein the processor is further configured for:
    reading second control information on the second channel, the second control information corresponding to a second data channel on the single carrier; and
    receiving, via the transceiver, system information carried on the second data channel, the system information providing information sufficient for the UE to access the single carrier.

9. A scheduling entity configured for wireless communication, comprising:
    a processor;
    a transceiver communicatively coupled to the processor;
    a memory communicatively coupled to the processor, wherein the processor is configured for:
        transmitting a first sync signal (SS) on a single carrier, via the transceiver, using an SS numerology, the first SS comprising first configuration information corresponding to a first channel on the single carrier;
        transmitting the first channel on the single carrier, via the transceiver, using a first numerology; and
        transmitting a second channel on the single carrier together with the first channel, via the transceiver, wherein the second channel is transmitted using a second numerology, different from the first numerology.

10. The scheduling entity of claim 9, wherein the first configuration information comprises information indicating that the first channel has the first numerology.

11. The scheduling entity of claim 9, wherein the SS numerology is the same as the first numerology, and wherein the second numerology differs from the SS numerology and the first numerology.

12. The scheduling entity of claim 9, wherein the processor, being configured for transmitting the first channel, is further configured for transmitting, via the transceiver, control information corresponding to a data channel on the first channel, and
    wherein the processor is further configured for transmitting the data channel according to the control information, via the transceiver, the data channel comprising system information providing information sufficient for a user equipment to access the single carrier.

13. The scheduling entity of claim 9, wherein the processor is further configured for transmitting a redirection indication, via the transceiver, using the first numerology, the redirection indication comprising information about the second channel on the single carrier having the second numerology,
    wherein the processor, being configured for transmitting the second channel, is further configured for configuring the second channel according to the information about the second channel carried on the redirection indication.

14. The scheduling entity of claim 13, wherein the information about the second channel comprises information indicating that the second channel has the second numerology.

15. The scheduling entity of claim 13, wherein the redirection indication is configured to instruct a subset of user equipment (UEs), which are in communication with the scheduling entity over the single carrier, to redirect to the second channel, having the second numerology, such that the scheduling entity maintains communication with at least one UE over the single carrier using the first numerology.

16. The scheduling entity of claim 9, wherein the processor is further configured for:
transmitting a second SS on the single carrier, via the transceiver, using the SS numerology, the second SS comprising second configuration information corresponding to the second channel on the single carrier.

17. The scheduling entity of claim 16, wherein at least one of:
the first configuration information comprises information indicating that the first channel uses the first numerology; or
the second configuration information comprises information indicating that the second channel uses the second numerology.

18. The scheduling entity of claim 16, wherein the SS numerology is the same as one of the first numerology or the second numerology.

19. The scheduling entity of claim 16, wherein the first SS further comprises information about the second SS, sufficient for a user equipment receiving the first SS to locate the second SS in the single carrier without further search of the single carrier.

20. The scheduling entity of claim 9, wherein the SS numerology is the same as the first numerology, and wherein the processor is further configured for transmitting a second SS on the single carrier, via the transceiver, using a second numerology, the second SS comprising second configuration information corresponding to the second channel on the single carrier.

21. A method of wireless communication operable at a user equipment (UE), comprising:
searching a single carrier for a sync signal (SS) having an SS numerology, wherein the single carrier comprises waveforms of a plurality of different numerologies including at least two of: the SS numerology, a first numerology, and a second numerology;
detecting a first SS and reading first configuration information carried on the first SS, wherein the first configuration information corresponds to a first channel on the single carrier, and indicates that the first channel has the first numerology; and if the UE supports the first numerology, receiving the first channel based on the first configuration information, the first channel having the first numerology; and
if the UE does not support the first numerology, forgoing to receive the first channel.

22. The method of claim 21, wherein the SS numerology is the same as the first numerology, and wherein the second numerology differs from the SS numerology and the first numerology.

23. The method of claim 21, wherein the SS numerology differs from the first numerology.

24. The method of claim 21, wherein the UE supports the first numerology, the method further comprising:
reading first control information on the first channel, the first control information corresponding to a first data channel on the single carrier; and
receiving system information carried on the first data channel, the system information providing information sufficient for the UE to access the single carrier.

25. The method of claim 21, wherein the UE supports both the first numerology and the second numerology, the method further comprising:
receiving a redirection indication comprising information about a second channel having the second numerology on the single carrier;
redirecting to the second channel; and
receiving the second channel based on the redirection indication.

26. The method of claim 21, wherein the UE does not support the first numerology, and wherein the first SS further comprises information about a second SS on the single carrier, the method further comprising:
reading second configuration information carried on the second SS, wherein the second configuration information corresponds to a second channel on the single carrier, the second channel having the second numerology, which differs from the first numerology.

27. The method of claim 21, wherein the UE does not support the first numerology, the method further comprising:
continuing the searching the single carrier for an SS;
detecting a second SS and reading second configuration information carried on the second SS, wherein the second configuration information corresponds to a second channel on the single carrier, and indicates that the second channel has the second numerology; and
if the UE supports the second numerology, receiving the second channel based on the second configuration information, the second channel having the second numerology.

28. The method of claim 27, further comprising:
reading second control information on the second channel, the second control information corresponding to a second data channel on the single carrier; and
receiving system information carried on the second data channel, the system information providing information sufficient for the UE to access the single carrier.

* * * * *